Sept. 23, 1924.
W. T. JACKMAN
1,509,600
MACHINE FOR PLACING RINGS ON BOBBINS AND THE LIKE
Filed Feb. 21, 1923
7 Sheets-Sheet 1
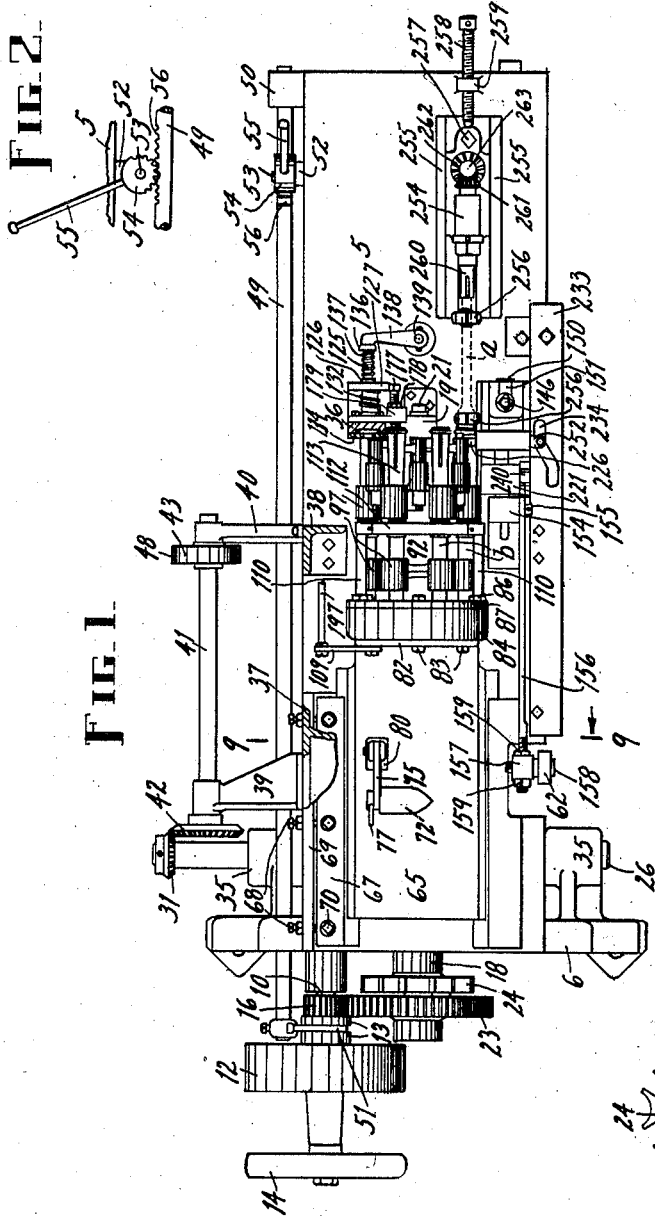
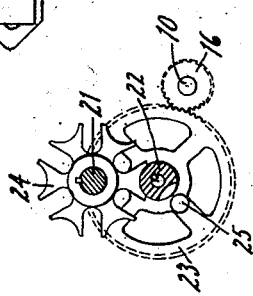

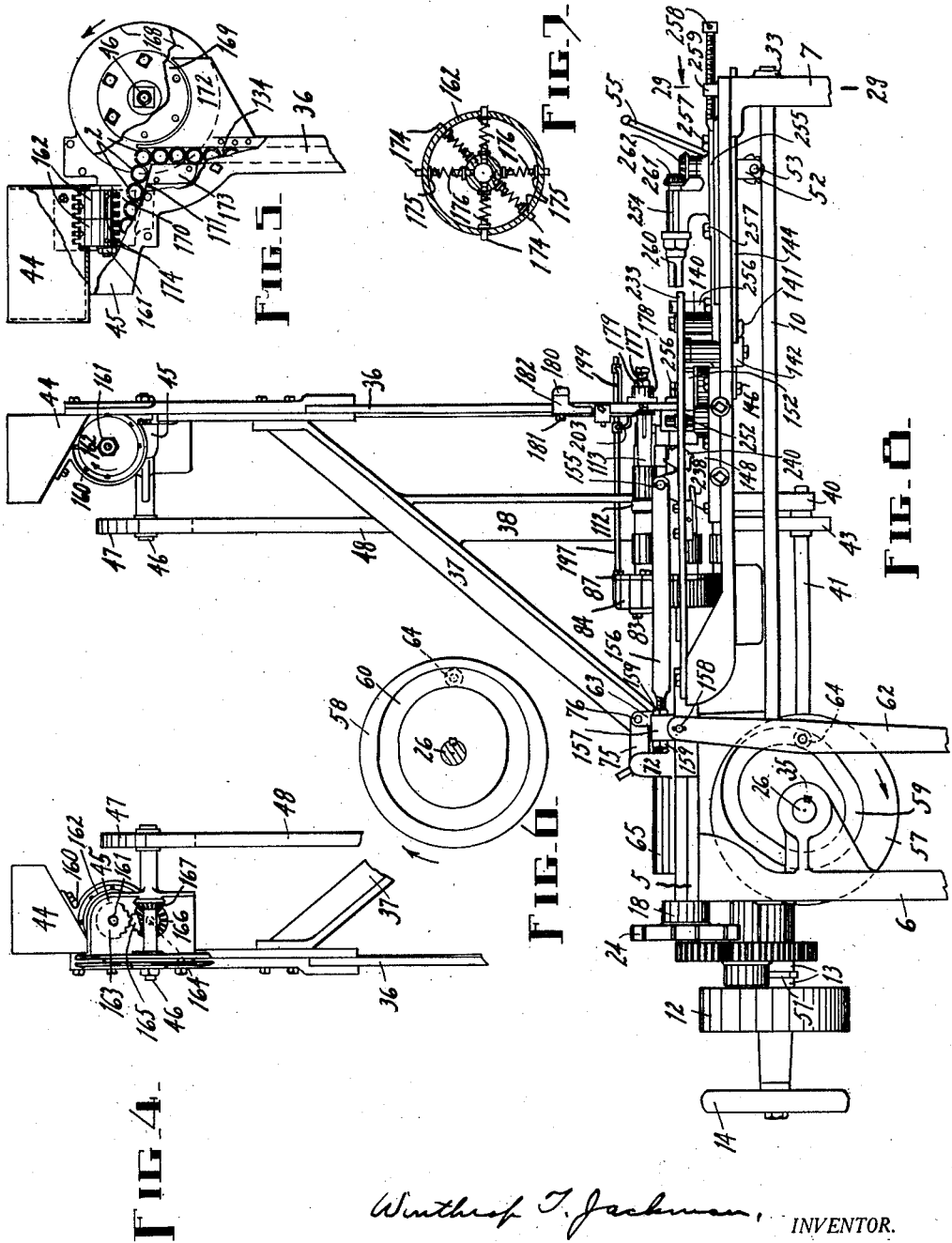

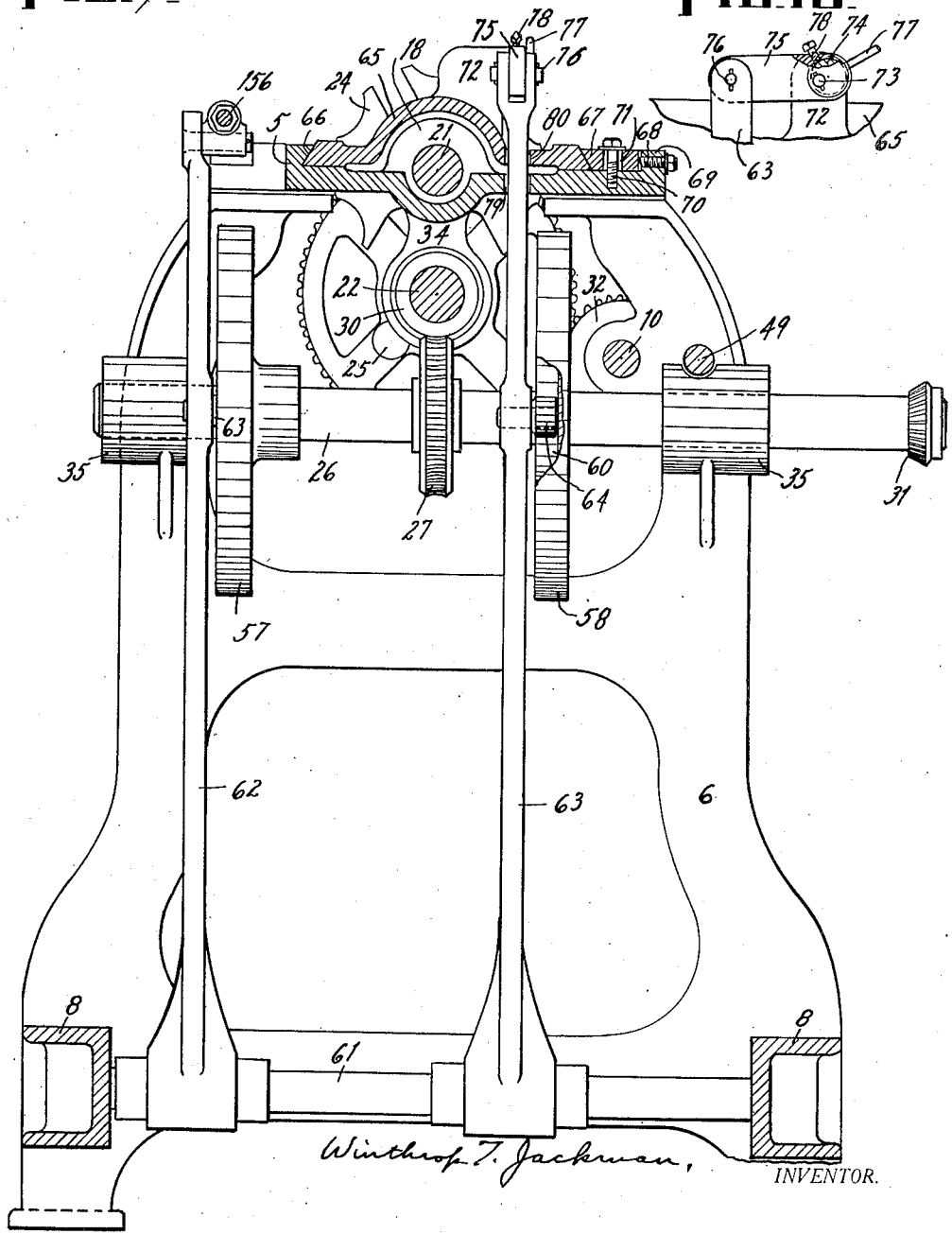

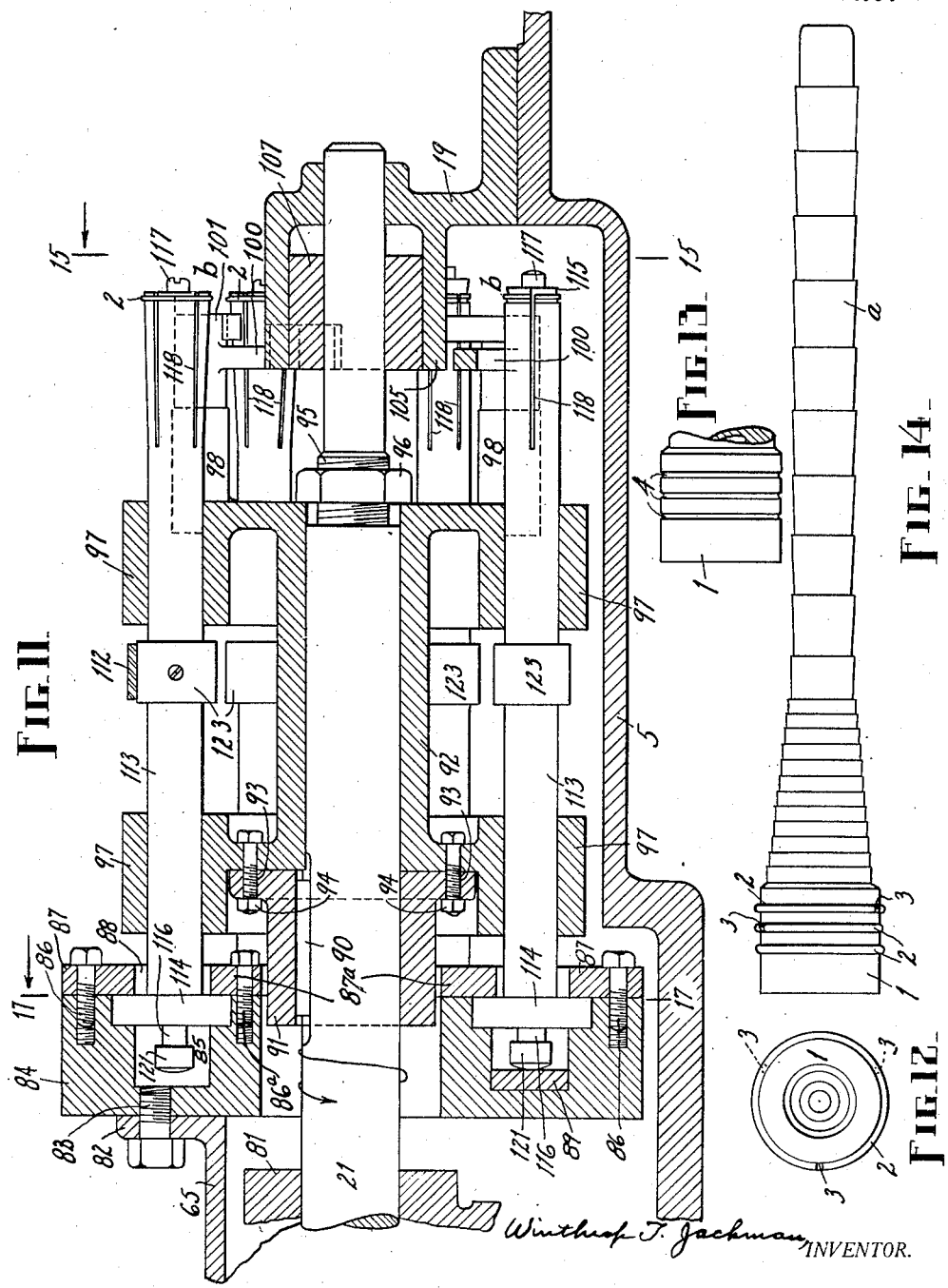

Sept. 23, 1924.
W. T. JACKMAN
1,509,600
MACHINE FOR PLACING RINGS ON BOBBINS AND THE LIKE
Filed Feb. 21, 1923
7 Sheets-Sheet 5
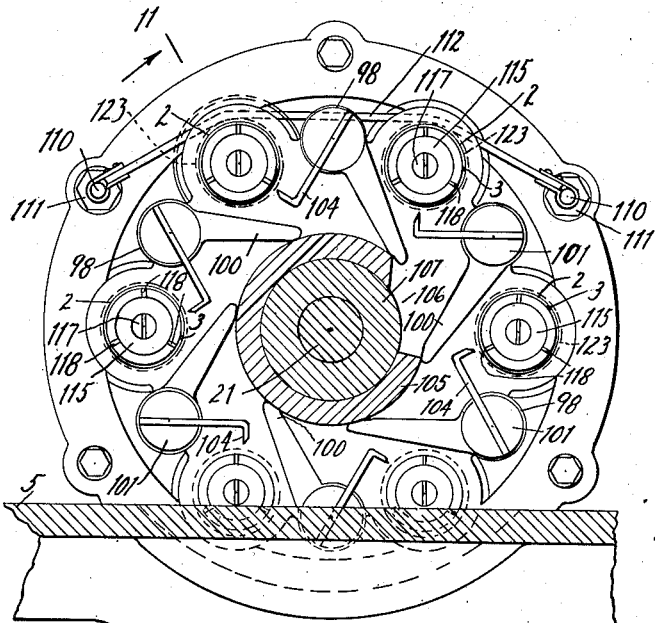
FIG.15.
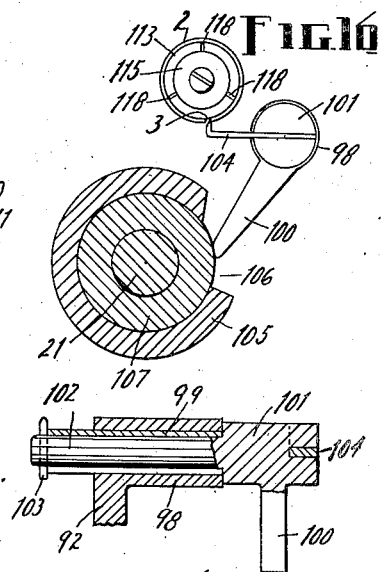
FIG.16.
FIG.16a.
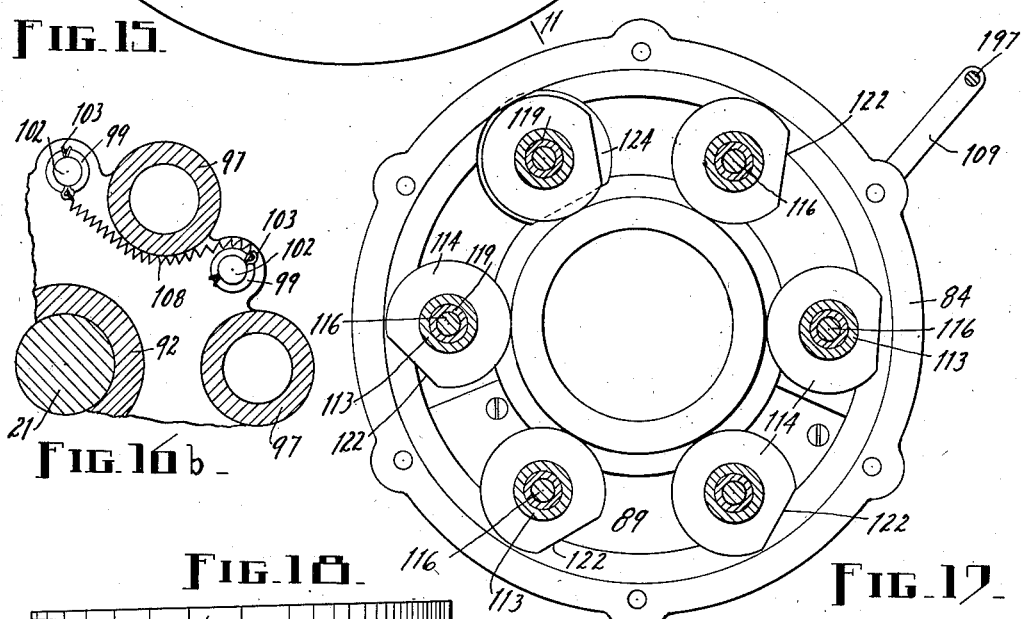
FIG.16b.
FIG.18.
FIG.17.
Winthrop T. Jackman, INVENTOR.
BY
Frank A. Cutter, ATTORNEY.

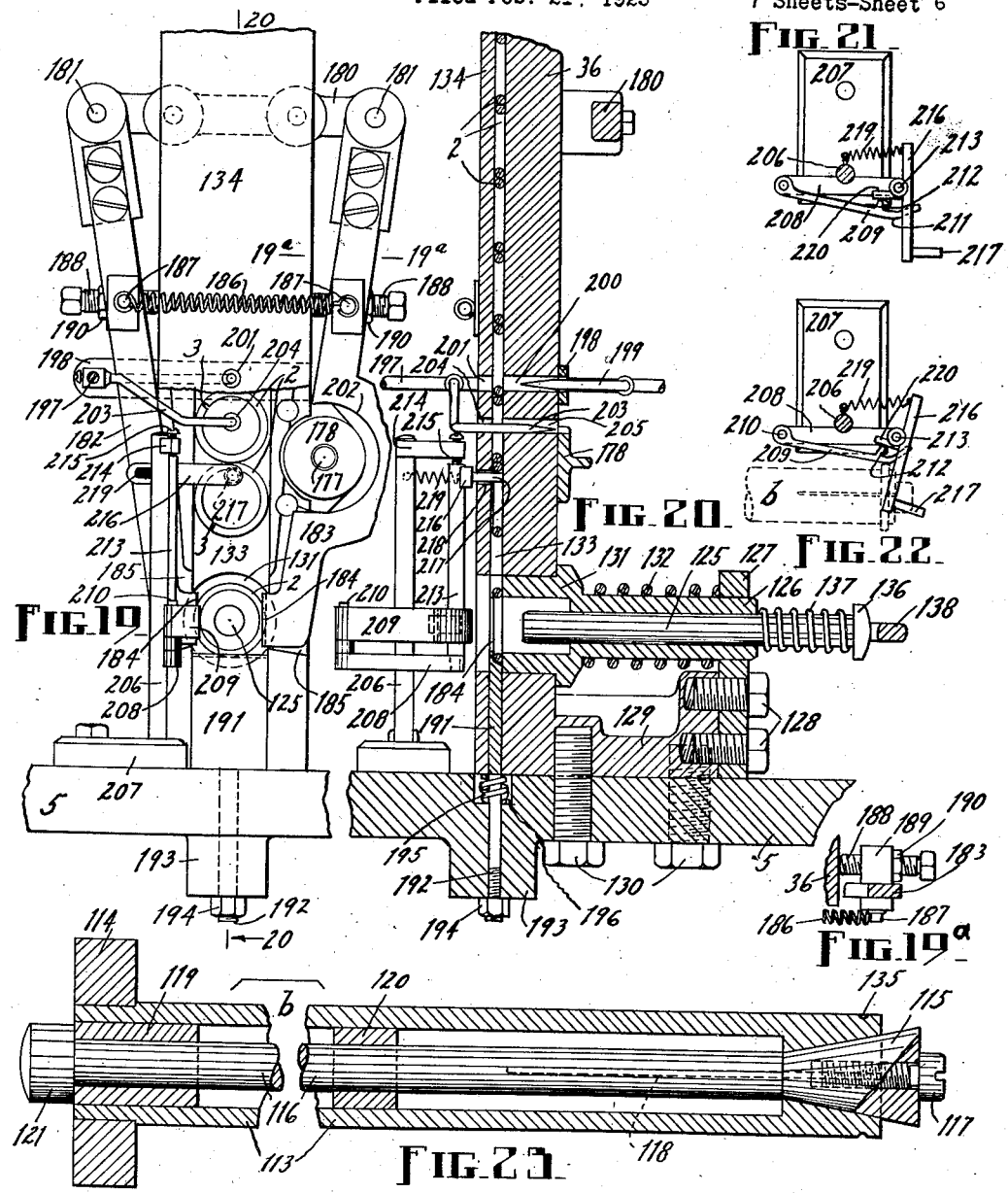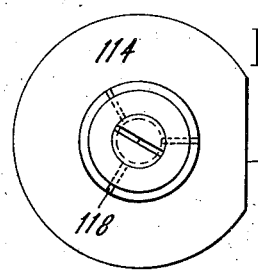

Sept. 23, 1924.  
W. T. JACKMAN  
1,509,600  
MACHINE FOR PLACING RINGS ON BOBBINS AND THE LIKE  
Filed Feb. 21, 1923    7 Sheets-Sheet 7
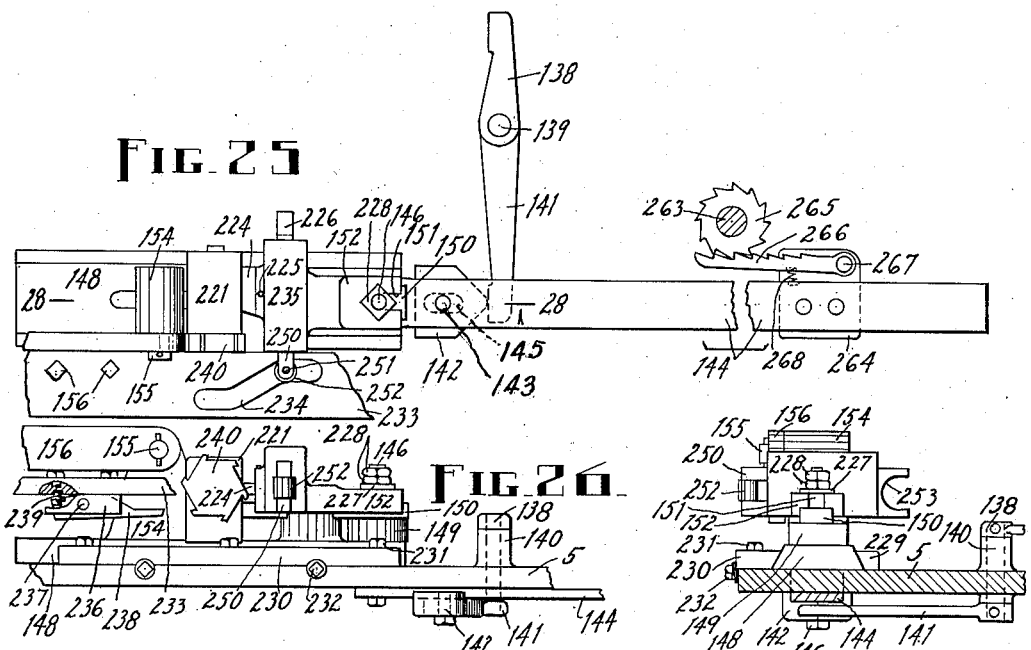
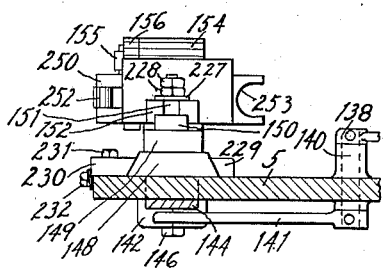
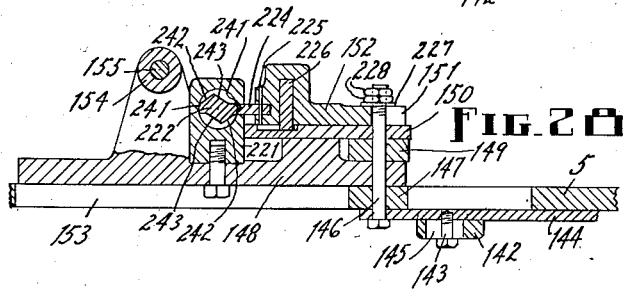
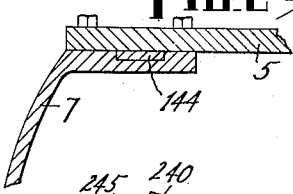
Winthrop T. Jackman, INVENTOR.
BY
Frank A. Cutter, ATTORNEY.

Patented Sept. 23, 1924.

1,509,600

UNITED STATES PATENT OFFICE.

WINTHROP T. JACKMAN, OF EAST CORINTH, VERMONT.

MACHINE FOR PLACING RINGS ON BOBBINS AND THE LIKE.

Application filed February 21, 1923. Serial No. 620,363.

*To all whom it may concern:*

Be it known that I, WINTHROP T. JACKMAN, a citizen of the United States of America, and a resident of East Corinth, in the county of Orange and State of Vermont, have invented a new and useful Machine for Placing Rings on Bobbins and the like, of which the following is a specification.

My invention relates to improvements in machines for automatically placing expansible, split rings on bobbins and the like, and broadly and generally consists of mechanism for feeding the rings from a suitably located and properly equipped hopper, by a step-by-step movement, to the receiving station, a series of expanding and contracting spindles mounted for reciprocation and orbital movement, each of said spindles being capable of taking a ring at said receiving station, and carrying said ring to the delivery station, meanwhile expanding the ring, spacer mechanism for adjusting the ring circumferentially so that the joint between the ends of the ring is located in an unvarying, predetermined position, spacing and setting mechanisms for forcing the ring from its spindle and placing and properly locating or spacing the same on the bobbin, mechanism for receiving, carrying, and intermittently rotating said bobbin, to the end that the rings shall be set thereon with their joints in offset relationship, means for resetting the ring-feeding mechanism by hand in the event the feeding operation be interrupted by reason of the failure of the spindle at the receiving station to take a ring, means to adapt the spacer mechanism for handling one or more rings, means of adjustment whereby bobbins of different lengths can be accommodated and rings successfully placed thereon, and suitable driving mechanism, together with such other adjusting features, and parts and members as may be neccessary or desirable in order to render the machine complete in every respect, all as hereinafter set forth.

This ringing machine may be constructed to handle and apply different numbers of split rings to one or more bobbins at each complete cycle of the machine. In the present construction three rings are set on each of two bobbins at each complete cycle. There are six spindles, and the work done by each and in connection with each is repeated by and in connection with that which follows. Starting at what is termed the receiving station, one of the six spindles receives a ring and is partially expanded at that point, and when the spindle has passed through one-sixth of its orbit the same is fully expanded and expands the ring carried thereby. At the end of another one-sixth of the aforesaid orbit the spindle arrives at what is termed the delivery station and the expanded ring on said spindle is forced from the latter onto the bobbin which is in position to receive the same. Before arriving at the delivery station the ring is adjusted circumferentially to locate the joint therein in a predetermined position. Finally, the aforesaid spindle moves through the remaining one-half of its orbit, from the delivery station to the receiving station, and during such movement is collapsed and thereby made ready, by the time said receiving station is reached again, to take another ring. As soon as the first ring is set on the bobbin, said bobbin has imparted thereto one-third of a revolution, consequently, when the next ring is set thereon, the joint in said last-named ring is in proper offset relationship to the joint in said first-named ring, and so in regard to the third ring which is set on the bobbin. Furthermore, the second ring is spaced the proper distance from the first ring, and the third ring is spaced the proper distance from the second ring. After the third ring has been set on the bobbin the latter is removed and another placed in ringing position, and after the third ring has been set on the second bobbin the machine finishes its complete cycle. By complete cycle is meant one complete revolution of the turret which carries the six spindles. At each one-sixth of a revolution the carriage with the spindles is advanced and retracted. The turret turns on its axis only when the carriage and spindles are in retracted position.

Bobbins and like articles or objects used in the spinning and kindred arts are provided externally, usually at their large ends, with one or more rings, three of such rings being most generally employed. Resilient, split rings are used for this purpose in order that, when they are forced into place on the bobbin, they will contract and engage the bobbin so forcibly as practically to preclude the danger of dislodgement or displacement. The bobbin is provided with grooves to receive the rings, and it is necessary that the latter not only be placed in such grooves, but be arranged with the joints between the ends of the rings out of line with each other. When three rings are used, it is customary so to space the joints apart that each is distant from another approximately one-third of the circumference of the part of the bobbin on which said rings are mounted. Heretofore the rings have been placed on the bobbins by a combination of machine and hand operations, involving some considerable skill on the part of the operator, and the primary object of my invention is to set the rings on the bobbins automatically, or without the aid of the operator except to place the bobbins in the machine and remove them therefrom.

In the old way, an operator after some three years experience is able to ring from six thousand to eight thousand bobbins per day, while with this machine twenty thousand bobbins per day can be ringed. A further object is, therefore, to produce a machine with which the operation of ringing bobbins is greatly enhanced so far as speed is concerned. Incidentally the ringing operation performed with my machine is more accurate than that performed in part by hand, as must necessarily be the case when a machine successfully supplants the hand.

Another object is to provide a machine of this character which is capable of ringing bobbins of different lengths and which require different numbers of rings. In this connection it may be noted that bobbins at their large ends are quite generally of approximately the same diameter and require rings of one diameter only, although provision is made in this machine for handling rings of different diameters.

Still another object is to afford means for driving the machine from a single point or driving member, and so to synchronize the moving parts as to produce the desired results efficiently and practically.

Other objects and advantages will appear in the course of the following description.

A preferred embodiment of my invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like reference characters designate like parts throughout the several views, Figure 1 is a top plan of a ringing machine which embodies a practical form of my invention as aforesaid, the greater portion of the ring-feeding parts and members being omitted; Fig. 2, a detail, in rear elevation, of parts of the clutch-operating mechanism; Fig. 3, a detail of the Geneva movement as viewed from the right-hand side; Fig. 4, a rear elevation of the upper portion of the ring-feeding mechanism; Fig. 5, a right-hand side elevation of such portion of said mechanism, with parts broken away; Fig. 6, a front elevation of the carriage-operating cam; Fig. 7, a sectional detail of one of the ring agitators; Fig. 8, a front elevation of said machine; Fig. 9, a vertical, transverse section through said machine, taken on lines 9—9, looking in the direction of the associated arrow, in Fig. 1; Fig. 10, a detail of the adjusting members for the carriage-operating link, as viewed from the rear, and with parts broken away; Fig. 11, a longitudinal section through a portion of the carriage, turret, and other parts of the machine, taken on lines 11—11, looking in the direction of the associated arrow, in Fig. 15; Fig. 12, an end elevation of the head of a bobbin which is equipped with three rings; Fig. 13, a side elevation of said head before the rings are applied thereto; Fig. 14, a side elevation of said bobbin and rings; Fig. 15, an end elevation of and partial transverse section through said turret and parts and members carried thereby and closely associated therewith, taken on lines 15—15, looking in the direction of the associated arrow, in Fig. 11; Fig. 16, an operative view of one of the ring-joint spacers; Fig. 16$^a$, a longitudinal section through one of said joint spacers; Fig. 16$^b$, a sectional detail showing the means by which the joint-spacers are yieldingly retained with their dogs in the path of the associated cam; Fig. 17, a right-hand elevation of the tube-race and cross section through the ring spindles, taken on lines 17—17, Fig. 11; Fig. 18, a bottom plan of the cone-ejector cam; Fig. 19, a left-hand side elevation of the lower portion of the ring-feeding mechanism and certain closely associated parts; Fig. 19$^a$, a cross section looking down, on lines 19$^a$—19$^a$, Fig. 19; Fig. 20, a transverse, vertical section through that portion of the ring-feeding mechanism that is illustrated in Fig. 19, and through said closely associated parts, being taken on lines 20—20, looking in the direction of the associated arrow, in said last-named view; Fig. 21, a top plan of a portion of said ring-feeding mechanism; Fig. 22, a plan similar to that shown in the preceding view, but illustrating the operation of the parts; Fig. 23, a central, longitudinal section through one of the ring spindles, an intermediate portion of such spindle being broken out and a portion of the cone broken away; Fig. 24, a right-hand end elevation of said spindle; Fig. 25, a top plan, with parts broken out, of the ring-spacing and ring-setting mechanism or mechanisms, and of a portion of the bobbin-actuating mechanism; Fig. 26, a front elevation of certain of the parts and members which appear in Fig. 25; Fig. 27, a right-hand end elevation of parts and members shown in Fig. 26, the table being in section; Fig. 28, a longitudinal vertical section through said ring-spacing and ring-setting mechanisms, on lines 28—28, looking in the direction of the associated arrow, Fig. 25; Fig. 29, a sectional detail through the frame of the machine at the right-hand front corner, on lines 29—29, looking in the direction of the associated arrow, Fig. 8; Fig. 30, a side elevation of the three-ring spacer; Fig. 31, a right-hand side elevation of the spacer box with parts broken away, and, Fig. 32, a rear end elevation of a two-ring spacer.

The first six views and Fig. 8 of the drawings are all drawn to the same scale, so also are Figs. 7, 9, 10, 25, 26, 27, 28, and 29, but on a larger scale than those in the first group, while on a still larger scale are Figs. 11, 15, 16, 16ª, 16ᵇ, 17, 18, 19, 19ª, 20, 21, 22, 30, 31, and 32, and on the largest scale of all are Figs. 12, 13, 14, 23, and 24.

The directions of moving parts are indicated where practicable by arrows other than those of which mention has heretofore been made.

In Fig. 1 a bobbin is represented by dotted lines at *a*. This bobbin is shown in full in Fig. 14.

This machine is designed to place on the head of a bobbin, such as is shown in Figs. 12, 13, and 14, three split rings, and to locate such rings equidistant apart longitudinally of said head and with the joints therein equidistant apart circumferentially of said head. The bobbin head is represented at 1 and the rings at 2, the joints in said rings being indicated at 3. The head 1 is provided initially with three exterior, annular grooves 4 which are equidistant apart, to receive the rings 2. In order to set the rings 2 in the grooves 4, it is necessary to expand each ring until it has an interior diameter that approximately equals the exterior diameter of the head 1, and to force such ring onto said head the required distance to enable the ring to contract into one of the grooves 4, the first ring being located in the innermost groove, the second ring in the intermediate groove, and the third ring in the outermost groove. Before the rings are thus set they must be adjusted circumferentially so that they are presented with their joints in a uniform manner or always in the same position to the bobbin head, to the end that the bobbin can have imparted thereto one-third of a revolution after the first ring has been set, and another third of a revolution after the second ring has been set, and thus properly space said joints apart circumferentially or cause them to be so spaced. The head 1 might have less than three gooves 4 therein, and thus be adapted to receive a less number of rings 2. Seldom is a bobbin provided with more than three rings.

The lower or main supporting frame of this machine consists generally of a table 5 supported on left-hand and right-hand end uprights or legs 6 and 7, respectively, said legs being connected a short distance above the portions of the same that rest on the floor by a pair of longitudinally-extending tie-beams 8. A main driving shaft 10 is provided for the machine and extends longitudinally thereof and beyond the leg 6. The shaft 10 is driven, from any suitable source of power, by means of a belt (not shown) applied to a pulley 12 mounted on the protruding, left-hand terminal portion of said shaft and adapted to be secured thereto and released therefrom by means of a friction-clutch represented at 13. The shaft 10 is provided beyond or to the left of the pulley 12 with a hand-wheel 14 by means of which said shaft can be rotated should occasion require. A pinion 16 is secured to the shaft 10 at the right of the friction-clutch 13. Journaled above the table 5, in bearings 18, 19, and 81, Figs. 1, 8, 9, and 11, in approximately the central, longitudinal, vertical plane of the machine, is a shaft 21, and journaled in suitable bearings below said table and directly beneath said first-named shaft, at the left-hand end of the machine, is a shaft 22. Secured to the shaft 22 is a crank gear 23 which intermeshes with the pinion 16. A Geneva wheel 24 is secured to the shaft 21, and the gear 23 is provided with a pin 25 to actuate said wheel in the customary manner. The Geneva wheel 24 has six arms, consequently said wheel has imparted thereto one-sixth of a revolution at each revolution of the gear 23, and has the same number of intervening dwells. A transverse shaft 26 is journaled in suitable bearings on the inside of the leg 6, and secured to this shaft is a worm-wheel 27. A worm 30 is secured on the shaft 22 and intermeshes with the worm-wheel 27—see Fig. 9. The pinion 16, gear 23, and Geneva wheel 24, as well as the pulley 12 and the hand-wheel 14, are at the left beyond the leg 6. A bevel-gear 31 is secured to the shaft 26 behind the frame.

The shaft 10 is journaled at the left-hand terminal in a bearing 32, Fig. 9, and at the right-hand terminal in a bearing 33 provided in the leg 7, as shown in Fig. 8. A bearing for the shaft 22 appears at 34, and bearings for the shaft 26 appear at 35—35, in Fig. 9.

A ring chute 36 is erected on the table 5, and said chute is braced from said table by means of an oblique angle-iron 37, the latter in turn being partially supported from said table by means of a vertical angle-iron 38. Extending rearwardly from the angle-irons 37 and 38 at their bases are bearing brackets 39 and 40, respectively. Journaled in the bearings provided at the rear ends of the brackets 39 and 40 is a horizontal shaft 41. Secured on the shaft 41, at the left of the bearing part of the bracket 39, is a bevel-gear 42 which intermeshes with the bevel-gear 31. A pulley 43 is secured on the shaft 41 inside of the bearing arm 40.

Secured to the chute 36 at the top is a ring hopper 44, the bottom of said hopper inclining upwardly and to the left from said chute. Also secured to the chute 36 at the upper terminal thereof, but below the hopper 44, is a feed-roll case 45. A shaft 46 is journaled in the chute and case, and extends to the left from said case. Mounted on and secured to the left-hand terminal portion of the shaft 46 is a pulley 47 which is located directly above the pulley 43, and said pulleys are connected by a belt 48.

A horizontal shipper bar 49 is slidingly arranged in the leg 6 and a lug 50 which extends rearwardly from the leg 7. The bar 49 extends to the left beyond the leg 6, and has secured to such protruding terminal the head of a clutch-fork 51 by means of which the clutch 13 is operated. The table 5 is provided with a lug 52 at the left of the lug 50, and set in said lug is a horizontal, rearwardly-extending stud 53, upon which is loosely mounted a segmental-gear 54. The segmental-gear 54 is provided with an upwardly-extending lever or handle 55. Rack teeth 56 are cut in the top of the bar 49 in position to intermesh with the teeth of the segmental-gear 54, which latter is located above said bar.

When the handle 55 is actuated to the left, the segmental-gear 54 carries the bar 49 in the same direction, and causes the clutch 13 to be operated in a manner to bring about the disengagement of the pulley 12 from the shaft 10, so that the former revolves freely without said shaft; and, when said handle is actuated in the opposite direction, said segmental-gear carries said bar in the opposite direction, and causes said clutch to be operated in a manner to bring about the connection of said pulley with said shaft, so that the latter rotates with or is rotated by the former. The clutch 13 and the operating means therefor are generally old and well known both structurally and operatively.

When the shaft 10 is in motion, the shaft 22 is driven therefrom through the medium of the pinion 16 and the gear 23, and the shaft 21 is intermittently driven therefrom through the medium of the pin 25 and the Geneva wheel 24. At the same time the shaft 26 is driven through the medium of the worm 30 and the worm-wheel 27, and the shaft 41 is driven through the medium of the bevel-gears 31 and 42. The shaft 41 drives the shaft 46 through the medium of the pulleys 43 and 47 and the belt 48. A ringer cam 57 and a carriage cam 58 are secured to the shaft 26, intermediate of the bearings 35, and driven by said shaft. There is a groove 59 in the face of the cam 57, and a groove 60 in the face of the cam 58.

A transverse shaft or rod 61 is supported by the tie-beams 8 below the cams 57 and 58, and loosely mounted on said rod are cam arms 62 and 63, the former extending upwardly in front of the cam 57, and carrying on the backside thereof a roller 64 which is in the groove 59, and the latter extending upwardly in front of the cam 57, and carrying on the backside thereof a roller 64 which is in the groove 60.

The table 5 is higher at the left-hand than it is at the right-hand end, and a carriage 65 is mounted to slide longitudinally on the higher part of said table. The base of the carriage 65 has longitudinal edges that are beveled and received between an undercut flange 66 in front and a gib 67 behind, the front edge of said gib being undercut in a similar manner to the back edge of said flange. The gib 67 is adjusted by means of transversely-arranged, horizontal bolts 68 tapped into a flange 69 on top of the table 5 at the rear edge and extending to the right from the left-hand end thereof, and vertical bolts 70 which pass down through slots in the gib 67, one of which slots appears at 71 in Fig. 9, to be tapped into the table 5. The gib 69 and the bolts 68 and 70 function in the usual manner. On top of the carriage 65 is a lug 72, and extending rearwardly from said lug is a stud 73. Loosely mounted on the stud 73 is an eccentric 74 which is received in a corresponding recess in a link 75, and has a flange that bears against the backside of said link, as best shown in Fig. 10. The left-hand terminal of the link 75 is mounted on the eccentric 74, and the right-hand terminal of said link is pivotally connected at 76 with the upper terminal of the lever 63, such upper terminal being forked to receive said link. The eccentric 74 is provided with a radial arm or handle 77 to facilitate adjusting said eccentric on the stud 73. A bolt 78 is tapped into the upper edge of the link 75 and arranged when tightened to bear against the periphery of the eccentric 74, said bolt being radial to the true center of said eccentric. When the bolt 78 is loosened, the eccentric 74 can be partially rotated on the stud 73 to increase or decrease the distance between said stud and the pivot 76, thus decreasing or increasing the length of the stroke imparted by the lever 63 to the carriage 65. After the eccentric 74 is adjusted the same is secured by tightening the bolt 78.

There are slots 79 and 80 in the table 5 and the carriage 65, respectively, through which the lever 63 extends, said slots being of sufficient length to enable said lever to be oscillated to the extent required. The cam 58 is rotated by the shaft 76, and, through the medium of the roller 64, oscillates the lever 63, and the latter causes the carriage 65 to reciprocate, acting through the link 75 and the pivotal connections between said link and said lever and between said link and the lug 72.

Reference is now to be had more particularly to Figs. 11, 15, 16, 16$^a$, 16$^b$, 17, and 18. At the right-hand end of the carriage 65 is a flange 82, and bolted at 83 to this flange is a tube-race 84. There is an annular groove 85 in the tube-race 84, such groove being T-shaped in cross section, and opening through the right-hand face of said tube-race, adjacent to which face the wider portion of said groove is located. Securely bolted at 86 and 86$^a$, respectively, to the right hand face of the tube-race 84 are collars 87 and 87$^a$, respectively. The collars 87 and 87$^a$ are in the same vertical plane and spaced apart in such plane to form an annular slot 88 which is of the same size and diameter as the narrower portion of the slot 85. Secured to the tube-race 84, in the bottom part of the slot 85 and against the side of said slot which defines the innermost boundary thereof, is a cone-ejector cam 89. The exposed side of the cam 89 inclines from the rear end to the front end of said cam in such a manner that the former is wider than the latter.

Keyed at 90 to the shaft 21 is a flanged collar 91, and secured to the right-hand end of said collar, where the flange is located, is a turret 92. The turret 92 may be secured to the flange of the collar 91 by means of bolts 93 and nuts 94. There are central openings in the tube-race 84 and the collar 87$^a$ to accommodate the shaft 21 and the collar 91. That portion of the shaft 21 which is adjacent to the right-hand end of the turret 92 is screw-threaded, as represented at 95, and on such screw-threaded portion of said shaft is a nut 96. The nut 96 is set up against the contiguous end of the turret 92, so that said turret is held against endwise movement between said nut and the collar 91, which latter is rigidly secured to the shaft 21.

The turret 92 has two sets of six radial arms at the outer ends of which are hubs 97. The hubs 97 in each set are equidistant apart circumferentially, and the axis of any hub in one set is in line with the axis of the corresponding hub in the other set. The axes just referred to are horizontal, and the hubs 97 are bored thereon. Six spindles (each designated as a whole by the letter $b$, and which will hereinafter be fully described) are slidingly mounted and journaled in the hubs 97, one of such spindles passing through a hub in each of the two sets.

Extending to the right or forwardly from the corresponding end of the turret 92 are six hubs 98. The hubs 98 are spaced equidistantly apart circumferentially, and the axis of each is between the axes of the two most adjacent hubs 97. Within each hub 98 is a bushing 99 that projects beyond the left-hand end of said hub. A spacer dog 100 has a head 101 from the left-hand end of which extends a spindle 102 that is receivable and journaled in the bushing 99. The head 101 abuts the right-hand ends of the hub 98 and bushing 99. The spindle 102 projects beyond the left-hand end of the bushing 99, and a cotter-pin 103 passes through such projecting part of said spindle, and extends far enough on opposite sides thereof to engage said end of said bushing. Thus the spindle 102 is held in place in the bushing 99 by the head 101 and the cotter-pin 103. The spindle 102 is free to rotate in the bushing 99. Secured to each head 101 at the right-hand end thereof is a spacer-dog latch 104 which is in the form of a hook. Each latch 104 is located in operative position relative to the split terminal of one of the spindles and a ring thereon, there being a latch for each spindle.

The bearing 19 has a hollow member which extends to the left and forms what is termed a dog cam 105. The cam 105 behind has a recess 106 therein, and there is a bushing 107 in said cam.

The free terminals of the dogs 100 ride on the cam 105 and sequentially enter and leave the recess 106. The aforesaid free terminals may or may not contact with the bushing 107, accordingly as to whether or not there be a split ring on the adjacent spindle, as will presently be made clear. When any dog 100 enters the recess 106, the head to which said dog is attached is rocked and with it the spindle 102 in the bushing 99 therefor, and the latch 104 that is attached to said head is actuated thereby in such a manner as to carry the free end of said latch outwardly, and, when said dog leaves said recess, said head is rocked again, but in the opposite direction, and said latch is returned to its former or initial position. The dogs 100 are retained with their free ends in contact with the cam 105 and the bushing 107, or in readiness to contact with said bushing, by means of springs, one of which is clearly shown at 108 in Fig. 16$^b$. Each spring 108 is inside of one of the right-hand hubs 97 superficially considered, and bears against said hub, and said spring has one end attached to the cotter-pin 103 inside of the spindle 102 in which said cotter-pin is inserted, and the other end attached to the cotter-pin 103 outside of the spindle 102 in which said last-named cotter-pin is inserted, said spindles being on opposite sides of said hub. In the example shown in Fig. 16ᵇ, the left-hand cotter-pin 103 is arranged with its head directed inwardly, while the right-hand cotter-pin 103 is arranged with its head directed outwardly, and opposite terminals of the spring 108 are attached to said heads. The spring 108 tends, therefore, to rotate both spindles 102 in the same direction, which is the direction to retain the dogs 100 in contact with the cam 105 and cause said dogs to enter the recess 107. The arrangement of the cotter-pins and springs is duplicated for the other two pairs of spindles 102. Secured by one of the bolts 65 to the carriage flange 82 is a rearwardly- and upwardly-extending arm 109, and extending to the right from the collar 87 are two rods 110. The rods 110 take the place of two of the bolts 86, and are above the horizontal, central plane of the collar 87, and nuts 111—111 are provided on said rods to take the place of the heads of the omitted bolts. Extending between the rods 110 adjacent to their free terminals is a friction band or belt 112.

Upon referring more particularly to Figs. 23 and 24, it will be seen that each of the six spindles (b) to which reference has been made comprises an expander tube 113, provided at the left-hand end with a head 114, an expander cone 115 at the right-hand end of a spindle or rod 116, and a bobbin-centering screw 117 tapped into the outer end of said cone. The tube 113 is bored throughout its entire length, and at the right-hand terminal of said tube the bore flares to receive the cone 115, and such terminal portion of said tube is longitudinally split, slitted, or slotted, as at 118, to enable expansion of said portion to take place when said cone is forced inwardly, and contraction thereof to take place when said cone is forced outwardly. In the present case there are three of the slits 118 which are equidistant apart and extend inwardly some little distance from the right-hand end of the tube 113. The rod 116 is supported in bushings 119 and 120 in the tube 113, and said rod is provided at the left-hand end outside of said tube with a head 121. The periphery of the head 114 is slabbed off, as represented at 122. The tube 113 is receivable in two of the hubs 97 which have their axes in line with each other, and in the annular slot 88, the head 114 is receivable in the wider part of the slot 85 in the tube-race 84, and the head 121 with a portion of the rod 116 is receivable in the narrower part of said last-named slot. The head of the screw 117 is of a size to be received in the bore through the bobbin head 1. The screw 117 is changed whenever necessary in order to enable the head thereof to fit the aforesaid bore, which bore may vary in bobbins of different sizes. Secured to each tube 113 is a roll or collar 123, said collar being located on said tube between the two hubs 97 which support the same and in position to be engaged by the friction band 112.

It will be remembered that the shaft 21 is intermittently rotated by the Geneva movement. When this shaft is rotated it carries with it the collar 91, the turret 92, and the spindles which consist in part of the tube 113, said tubes moving at their left-hand terminals in the slot 88, and the heads 114 and 121 and the left-hand terminal portions of the rods 116 moving in the slot 85. If, now, the ejector cam 89 be in the path of any head 121, said head is forced to the right by said cam and carries with it the attached and connected rod 116 and cone 115, thus permitting the split terminal of the tube 113 which was expanded by said cone to be contracted. It is to be assumed that, previous to the aforesaid movement imparted to the parts by reason of the contact with the cam 89 of the head 121, the cone 115 has been forced to the left to expand the split terminal of the tube 113, and has carried with it the attached and connected rod 116 and head 121. The means by which the expanding operation is performed will subsequently be explained. It is to be understood that the depth of the narrow portion of the slot 85, the proportions of the cam 89, and the amount of longitudinal movement of the cone 115 and attached and connected parts are all of such relationship as to enable the desired results to be produced. As each collar 123 is caused to pass beneath and in contact with the friction band 112, by the rotary motion of the turret 92, said collar is caused by said band to revolve, such revolution being in the opposite direction to that in which said turret rotates, and to cause the tube 113 on which said collar is mounted to revolve with the latter. The length of time in which said collar 123 is in contact or frictional engagement with the band 112, or the amount of such frictional engagement, must be sufficient to cause the tube 113 upon which said collar is mounted to make at least one complete revolution. In the present case each tube is caused to make several revolutions. The revolution of the tubes 113 on their axes, through the medium of the collars 123 and the band 112, is associated with the functions of the latches 104.

An opening 124, Fig. 17, is made in the tube-race 84, and extends from the wider portion of the slot 85 through to the left-hand face of said race. The opening 124 is circular except where flattened to correspond with the flattened part 122 of each of the heads 114, and said opening is slightly larger than any of said heads. The aforesaid flattened part of the opening 124 constitutes or forms the innermost part of the periphery of said opening. Upon positioning any tube 113 with its head 114 in line with the opening 124, and turning said tube and head so as to cause the flattened part 122 of the head to register with the flattened part of said opening, said head can be passed out through said opening and said spindle removed in this manner from the turret 92. The same or another spindle can be returned to place again in a similar manner to that described for the removal of a spindle. It sometimes becomes necessary to remove and replace a spindle, in order to repair the same or for some other reason, and to this end the opening 124 is provided. The opening 124 and the heads 114 are flattened in order to reduce to a minimum or practically eliminate any liability of accidental displacement through said opening of any spindle, inasmuch as some portion of the curved part of each head is most liable to be in engagement with the part of the tube-race which forms the straight edge of the opening 124, being inside of such part. Necessarily there must be a similar opening to the opening 124 in the flange 82.

The dwells of the Geneva movement occur while the right-hand end of one of the spindles $b$ is at the rear end of the horizontal diameter of the circle or orbit described by such end, and the corresponding end of another of said spindles is at the front end of such diameter, the corresponding ends of two of the other spindles then being at points in said orbit above such diameter, and the corresponding ends of the other two spindles being at points in said orbit below said diameter. During these dwells the spindles are actuated to the right or advanced and actuated to the left or retracted by the carriage 65, through the medium of the tube-race 84, the collars 87 and 87$^a$, and the heads 114, the tubes 113 sliding in the hubs 97. Each spindle receives a ring 2, while said spindle is located with its split terminal at the rear end of the aforesaid horizontal diameter, on such terminal, and such location is termed the receiving station; and each spindle delivers its ring, or such ring is forced off of the split terminal of said last-named spindle onto the bobbin head 1, while the spindle is located with its split terminal at the front end of said diameter, and such location is termed the delivery station.

Positioned at the receiving station, with its axis in line with the axis of any ring spindle when located at such station, is an expanding plunger 125—see Figs. 1 and 20. The plunger 125 is arranged to slide in a safety plug 126, and the latter is supported in and by the ring chute 36 and a vertical plate 127. The plate 127 is bolted at 128 to the right-hand end of a member 129 which rests on the table 5 and is bolted thereto at 130. The member 129 forms a part of the base of the chute 36, and extends to the right therefrom.

The plug 126 has a flanged head 131 which is received in the opening prepared for the same in the chute 36. Normally the flange of the head 131 is retained in contact with the right-hand side of the chute 36, by means of a spring 132 that encircles the plug 126 between said head and the plate 127, in which latter the tail-end of said plug is received. When the plug 126 is in normal position, the inner end of the head 131 is flush with the right-hand side of a vertical passage 133 formed in the chute 36 with the aid of a cover plate 134. When any ring 2 is in receiving position, it is in contact with the left-hand end of the head 131, and it is from such position that the ring is taken by one of the spindles, said head being chambered to permit the head of the screw 117, the protruding part of the cone 115, and a portion of the tube 113, which enter into the construction of the spindle, to enter. In the event the ring breaks, jams, or otherwise fails to become properly located on the tube 113, the spring 132 yields and permits the plug 126 to be actuated to the right, thus preventing damage to the machine that otherwise would be liable to occur. It should be noted here that the split terminal of each tube 113, near the leading end thereof, is grooved, as represented at 135 in Fig. 23, to receive, properly locate, and assist in holding in place the ring on said tube.

The plunger 125 is provided at the outer end with a head 136, and a spring 137 encircles said plunger between said head and the outer end of the plug 126. The spring 137 normally retains the plunger 125 with its head 136 against the rear terminal of an expanding lever 138, and when thus positioned the inner end of said plunger is in the chamber in the head 131, in position to be contacted with by the head of the screw 117 of any ring spindle at the receiving station. The spring 137 yields in the event the plug 126 be forced outwardly.

Upon referring to Figs. 1, 25, and 26, it will be seen that the lever 138 is mounted on a vertical spindle 139, which spindle is journaled in a bearing 140 with which the table 5 is provided, said bearing extending through said table. The lever 138 is secured to the upper end of the spindle 139 above the bearing 140, and a second expanding lever 141 is secured to the lower terminal of said spindle below said bearing. The lever 141 extends forwardly from the spindle 139 into the path of a block 142 which is secured, by means of a bolt 143, to the under side of a trip bar 144. A longitudinal slot 145 is provided in the block 142 to receive the bolt 143 and permit it to be adjusted longitudinally on the bar 144, in order that the movement imparted by said block to the lever 141 may be regulated.

The right-hand terminal portion of the bar 144 is supported by and slidingly arranged in the top of the leg 7 beneath the table 5 and a short distance back from the front edge of said table. The left-hand terminal of the bar 144 is supported by the head of a bolt 146, which bolt passes upwardly through said bar, a spacer block 147 above said bar, that portion of a ring-setter slide 148 that is above said block, a spacer block 149 above said portion of said slide, a bar 150 supported on said slide and last-named block, and a slot 151 in a ring-setter guide 152—as clearly shown in Fig. 28. There is a longitudinal slot 153 in the table 5 to accommodate the block 147. Rising from the slide 148 behind the guide 152 is a lug 154, and pivotally connected with said lug at 155 is an approximately horizontal link 156. The right-hand terminal of the link 156 is mounted on the pivot 155, while the opposite terminal of said link is provided with a head 157 to the front side of which is pivotally connected at 158 the upper terminal of the cam lever 62. The left-hand terminal portion of the link 156, which passes through the head 157, is screw-threaded to receive a nut 159 at each end of said head. By means of the nuts 159 the head 157 can be adjusted on the link 156 for the purpose of increasing or decreasing the stroke of said link, accordingly as said head be moved to the left or to the right on said link before being secured on said nuts.

By increasing or decreasing the stroke is meant, of course, the increasing or decreasing of the maximum limit of the thrust of the link to the right. This also applies to the adjustment which is provided between the lever 63 and the carriage 65.

The cams 58 and 59 are so constructed, related, and timed that, directly the cam 58 has caused the carriage 65 to be actuated into its most advanced position, the cam 59, acting through the roller 64, the lever 62, and the head 157, causes the link 156 to be actuated to the right, and said link carries with it the slide 148, and with said slide the bar 143 through the medium of the bolt 146. The slide 148 carries with it the block 142, and the latter forces the forward terminal of the lever 141 to the right, with the result that the lever 138, through the medium of the spindle 139, is actuated to the left and forces the plunger 125, against the resiliency of the spring 137, in the same direction. The inner terminal of the plunger 125 is then in contact with the head of the screw 117, and the inward movement of said plunger thereby forces the cone 115 into the tube 113 and expands the split terminal of said tube, the head 121 on the rod 116 with which said cone is connected being at this time located in the slot 85 behind or in a position where it is not interfered with by the cam 89. The expansion of the split terminal of the tube 113, produced in the manner just explained, causes the ring 2 which is now in the groove 135 on said terminal to be securely and tightly engaged by the expanded parts, and to be withdrawn from the receiving station when said tube is next retracted. The plunger 125 causes the split terminal of the tube 113 to be only partially expanded, however, such terminal not being fully expanded until said tube has been moved, by the turret 92 actuated by the Geneva movement, from the receiving station through the following one-sixth of the orbital path of the tube, when the latter is in position to be fully expanded and to expand the ring 2 thereon. This action causes the ring to be gripped with sufficient force to enable subsequent actions, which are dependent on a rigid connection between the spindle or its tube and said ring, and on an open joint in the ring, to take place.

For the complete expansion just referred to an expander screw or bolt 177 is provided, the same being received in and supported by a bracket 178 that is rigidly secured to the right-hand side of the chute 36 and projects forwardly therefrom—see Figs. 1, 8, and 19. The bolt or expander 177 is positioned by the bracket 178, with the axis of said expander in line with the axis of a spindle located by the first dwell after leaving the receiving station. When the spindles are next advanced, it being remembered that they are advanced and retracted together, the head of the screw 117 of the spindle which is in line with the expander 177 encounters the left-hand end of said expander, which end projects beyond the corresponding face of the bracket 178, and said head with its cone 115 is forced to the left to the extent required fully to expand the split terminal of the tube 113, in which said cone is located, and with said terminal the ring 2 thereon, opening the joint 3 in said ring. Then the spindles are retracted, and the spindle in question has the expanded ring tightly bound thereon and engaged therewith, so that the necessary, subsequent, circumferential adjusting of said ring and proper locating of the joint 3 therein can take place. The amount of expansion of the parts provided by the expander 177 is increased or decreased by screwing said expander to the left on the one hand and to the right on the other hand. The expander 177 is provided with a set-nut 179 to lock the same in place after adjustment.

Returning again to the spindle while at the receiving station and after being partially expanded by the plunger 125, it is to be noted that, upon the continued rotation of the cam 58, the carriage 65 is retracted and carries with it the spindles, including that which has just received the ring, and, upon the continued rotation of the cam 59, the link 156 is retracted, and with said link the intervening parts and members between the same and the block 142, with the result that said plunger is released to its spring 137 and thereby retracted. The spring 137 causes the plunger head 136 to be retained in contact with the lever 138, hence the retracting movement of the plunger 125 causes said lever and the lever 141 to be returned to their former or initial positions, and said lever 141 always to be in contact with the nose of the block 142. The block 142 naturally limits the outward movement of the plunger 125.

While the carriage and spindles are in retracted position, the Geneva wheel 24 is operated and causes the turret 92 with said spindles to be rotated one-sixth of a revolution, after which the dwell occurs while complete expansion takes place with the aid of the expander 177. Twice more the spindles are carried through one-sixth of their circuitous path, advanced and retracted, and started through still another one-sixth of said path, before the spindle, which has received a ring and been partially expanded at the receiving station, and passed to the next station and been fully expanded, arrives in position to be retracted by reason of contact of the head 121 of said spindle with the cam 89, the ring having meanwhile been removed from the spindle in the manner yet to be explained. It is while the spindle is passing from the delivery station to the receiving station that its head 121 encounters and rides past the cam 89, and the cone 155 of said spindle is forced outwardly so that the split terminal of the tube 113 of said spindle can and does contract. By the time the spindle again arrives at the receiving station it is contracted and ready to receive another ring.

It will be remembered that the spindles $b$ are rotated on their own axes by the collars 123 when the latter pass in contact with the friction band 112, and this during the time the dog 100 of the latch 101 that is associated with any given spindle is in the recess 106. While the dog 100 is in the recess 106, the latch 104 is caused to bear against the ring 2 on the spindle, being thus held by means of the spring 108 which acts on the spindle 102 that carries said dog and latch, with the result that, when the joint 3 in said ring arrives at said latch, the latter enters said joint and holds said ring, with the spindle $b$ upon which the ring is mounted, against further rotation, on the spindle ($b$) axis, causing the spindle ($b$) collar 123 to slip or drag without rotation beneath the band 112. The engagement of the latch 104 with the ring occurs, in the present example, while the spindle $b$ is being carried through the second one-sixth of its orbital path, starting from the receiving station, or after the second dwell has occurred and before the third dwell occurs, and sufficient time elapses between said dwells, or while said latch is in contact with said ring, to enable the ring to have imparted thereto, from the band 112, at least one complete revolution, in order to insure the entrance of the free terminal of said latch into the open joint of the ring. Regardless, therefore, of the radial degree of the joint 3 when it passes the second dwell, the latch always engages said joint, and said latch always leaves the same at a predetermined point in the arcuate path of the spindles. After this the ring has a predetermined amount of rotation. It follows, consequently, that the joint in each ring carried by each spindle finally arrives at the delivery station in a fixed or predetermined position radially, hence, in order to offset the joints of the rings on a bobbin, it is simply necessary partially to rotate the bobbin between the ring-setting operations. Before the spindle arrives at the third dwell, the dog 100 rides out of the recess 106 onto the periphery of the cam 105 again, and thus causes said latch to be withdrawn from engagement with the ring and located entirely out of contact therewith, remaining in such position until said dog again enters said recess. The depth of the recess 106 is sufficient, not only to permit the latch to engage the periphery of the ring, but also to enter the joint in said ring.

Before describing the ring-setting mechanism in detail, I will describe the ring-feeding mechanism, having special reference to Figs. 4, 5, 7, 8, 19, 19$^a$, 20, 21, and 22.

The passage 133 extends upwardly from the top of the table 5 to the top of the chute 36. This passage is of a size and shape which permits the rings 2 to descend therein in a vertical or upstanding position and one on top of the other. The leading end of each spindle $b$ enters the passage 133 from the side opposite to that where the safety-plug head 131 is located, and there is an opening in the cover 134 for such spindle end, the diameter of such opening and that in the chute 36 for said head being the same. The hopper 44 is supported from the chute 36 by means of a bracket 160, and the case 45 is bolted or otherwise securely attached to said chute, both the hopper and case being on the left-hand side of the chute. A shaft 161 is journaled in the case 45 at right-angles to and above the shaft 46. Mounted on the shaft 161 to rotate therewith in the front part of the case 45 is a pair of feed rolls 162. Secured to the shaft 161 in the back part of the case 45 is a cam 163. Journaled in and projecting into the back part of the case 45, directly beneath the shaft 163, is a shaft which is indicated by dotted lines at 164 in Fig. 4. Secured on the shaft 164 is a gear 165 which intermeshes with the gear 163, and secured on said shaft behind said first-named gear is a bevel-gear 166. Secured on the shaft 46 in position to intermesh with the bevel-gear 166 is a bevel-gear 167. The pulley 47 is secured on the left-hand terminal portion of the shaft 46, and on the right-hand terminal portion of said shaft is secured a sorter which consists of two large discs 168 separated by a small disc 169 all bolted together, substantially as shown in Fig. 5.

The shaft 46, when driven by the belt 48 and the pulley 47, rotates the sorter above described, and causes the feed rolls 162 to be revolved, through the medium of the bevel-gears 167 and 166, the shaft 164, the gears 165 and 163, and the shaft 161. The revolving feed rolls 162 agitate the rings in the hopper 44 and assist in carrying said rings or directing said rings downwardly into a slot or passage 170 in the case 45, while the sorter discs guide, direct, and urge said rings downwardly into and through the passage 133. The passage 170 receives the rings in vertical position from the feed rolls 162. The bottom of the passage 170 inclines downwardly and rearwardly, as clearly shown at 171 in Fig. 5, to meet the front edge of the passage 133 at the top. A plate 172 is secured to the back edge of the chute 36, and extends rearwardly from said chute. The front edge of the plate 172 forms the back side of the upper portion of the passage 133, and such edge extends above the level of the junction between the front edge or side of said passage and the rear end of the bottom or track 171, so that the rings 2, after being fed downwardly into the passage 170 and onto said track, and rolling rearwardly, are received against said edge of said plate and thereby directed downwardly into said passage 133, or, in other words, the course of said rings is interrupted by the upper projecting part of said plate, and said rings are thereby caused to descend into said passage 133. The part of the plate 172, of which mention has just been made, and other portions of said plate which are behind said part extend into the space between the discs 168, as also does the back portion of the member that forms the front side of the upper portion of the passage 133 and the rear portion of the track 171, thus locating the upper end of the passage 133 between said discs. The member of which mention has just been made is indicated by the numeral 173. The member 173, in addition to forming the front side of the upper portion of the passage 133, serves as a bridge over which the rings roll in their course from the passage 170 to the passage 133, the top of said member being a continuation or part of the track 171. The vertical rings in the passage 170 roll downwardly and rearwardly out of said passage and in between the discs 168 without being permitted to topple over or assume other than a vertical position, due to the fact that the rear end of said passage is so close to the peripheries of the discs 168. The annular space between the discs 168 is of the required depth and width to receive the rings, and as said discs and the disc 169 revolve they tend constantly to direct and urge said rings downwardly into the passage 133.

Each feed roll 162 consists of a hollow cylinder provided with a plurality of spring-pressed, radial pins 174 which project through openings in said cylinder. Each pin 174 has a shoulder 175 inside of the roll cylinder to limit the outward movement of said pin, and there is a spring 176 interposed between such shoulder and the hub of the roll, said pin and said hub being provided with the customary centering and engaging members for the spring. The springs 176 normally retain the pins 174 in their projected positions, when said pins protrude some distance beyond the outer surface of the cylinder or drum, but, as the roll revolves and said pins encounter obstructions, said springs yield and permit said pins to move inwardly until the obstructions are passed, when said springs thrust said pins outwardly again to their full extent. The pins 174 agitate the rings 2 in the hopper 44 and assist in carrying said rings downwardly into the passage 170. It is during this operation and when the rings become bunched together, or otherwise disposed so as to afford material resistance to the pins 174, that said pins are momentarily forced inwardly.

Secured to the right-hand side of the chute 36 is a horizontal, protruding bracket 180, such bracket extending beyond the front and back edges of said chute, and pivotally connected at 181 with the protruding terminals of said bracket are downwardly-extending locating arms 182 and 183, the latter being in front of the former. At the base of each of the arms 182 and 183 is a jaw 184. The arms 182 and 183 and the supporting parts therefor are so constructed that the jaws 184, after passing through suitable recesses in the front and back edges or sides of the chute 36, present approximately vertical, ring-engaging edges in the passage 133, which edges are in contiguity with the inner end of the plug head 131. The manner in which the chute 36 is cut out in order to enable the jaws 184 to enter the slot 133 from opposite edges thereof and have the required amount of play or movement is clearly shown at 185—185 in Fig. 19. The arms 182 and 183 are actuated toward each other by means of a spring 186 which has its ends attached at 187—187 to said arms. The inward movement of each of the arms 182 and 183 is limited by a horizontal bolt 188 which is tapped into and through a lug 189 (Fig. 19) secured on the right-hand side of the arm, whereby said bolt is located in position to engage with its inner end the contiguous edge of the chute 36. Each bolt 188 is provided with a set-nut 190 to lock the same in place after adjustment. By means of the bolts 188, the arms 182 and 183 are so adjusted as to permit a ring of any given size to be received between the adjacent edges of the jaws 184. The arm 123 is offset, as shown at 202 in Fig. 19, to clear the expander 177, and to accommodate the spindle with its ring when said spindle is advanced into engagement with said expander.

In the lower part of the passage 133 is a locating slide 191. This slide has a tailpiece 192 that extends downwardly through the table 5 and a boss 193 which depends from said table. The tail-piece 192 is screw-threaded to receive a nut 194 beneath the boss 193. A spring 195 is received in a recess 196 in the table 5 through which the tail-piece 192 extends, and said spring normally retains the slide 191 in its elevated position with the nut 194 against the underside of the boss 193, but said spring may yield and permit said slide to be forced downwardly. By screwing the nut 194 up or down on the tail-piece 192 the normal elevation of the slide 191 is decreased or increased accordingly, whereby said slide may be adapted to rings of different sizes. The upper part of the slide 191 is below the jaws 184 and in contiguity with the inner end of the plug head 131, and the top edge of said slide is shaped to receive a ring and hold the same against the contiguous end of the plug head 131, substantially as shown in Fig. 20. The ring-engaging edges of the jaws 184 also are similarly shaped or formed.

Each ring 2, when it arrives at the jaws 184, passes between the same and comes to rest on the upper edge of the slide 191. The ring is thus supported from below and in front and behind, the support being peripheral and of a nature to locate the ring with its axis in line with the axis of the plunger 125. Thus the ring is in the proper position to receive any spindle advanced at the receiving station. After the spindle receives the ring and the plunger 125 has been operated partially to expand the split portion of said spindle, the latter is retracted and carries with it the ring, the movement being to the left. This forces the ring from its position on the slide 191 and between the jaws 184, or withdraws said ring from the engagement therewith of said jaws and slide. This withdrawal is made possible by the presence of the springs 186 and 195, the former yielding to permit the ring to be withdrawn from between the jaws 184, and the latter yielding to permit the ring to be drawn over or forced by the upwardly-projecting edge portion of the top of the slide 191. As soon as the ring is withdrawn by the spindle, the springs 186 and 195 act to restore the jaws 184 and the slide 191 to their former positions in readiness to receive another ring. The expansive force exerted on the ring by the spindle, after the action of the plunger 125 has taken place, is sufficient to hold the ring securely in place on the spindle while said ring is being withdrawn from the locating arms and slide.

Having one terminal securely attached by means of nuts or otherwise to the rear end of the arm 109 is a horizontal rod 197. The rod 197 extends to the right from the arm 109, passes through a suitable opening in the forwardly-extending part of the upright 38, behind the chute 36, and through a suitable opening in an arm 198 which is securely attached to the right-hand side of said chute. The rod 197 is caused to be reciprocated, sliding in the arm 198 and the upright 38, with and by the carriage 65, inasmuch as the arm 109 is attached to the carriage flange 82. A ring-feed finger 199 extends forwardly from the rod 197 at the right of the arm 198, and is bent to the left and into parallel relationship with said rod. This parallel part is sharpened at its free end, and extends through an opening in the arm 198 into a transverse passage 200 in the chute 36, wherein said part operates. There is a transverse opening 201 in the plate or cover 134 of the chute, which opening is in line with the passage 200. The axes of the passage 200 and the opening 201, if continued to meet each other, would pass through the center of the passage 133 between the front and rear edges thereof. Extending forwardly and downwardly from the rod 197, at the left of the chute 36, and then to the right is a sharpened, ring-feed finger 203. The finger 203 extends into and operates in an opening 204 in the cover 134 and a passage 205 in the chute 36, said opening and passage being in line with each other, and below and in the same vertical plane with the opening 201 and the passage 200.

As the rod 197 reciprocates the rings 2 in the passage 133 are fed downward. On moving to the right the rod 197 carries the feed finger 203 through the axial center of the adjacent ring 2 in the passage 133, and the feed finger 199 out of the adjacent ring 2 in said passage, said feed fingers then being positioned and located substantially as best shown in Fig. 20; and in moving to the left said rod carries said finger 203 out of the ring through which said last-named finger extends, and said finger 199 through the next ring above. The results produced by the reciprocation of the fingers 199 and 203 will presently be explained more in detail.

As illustrated in Figs. 19, 21, and 22, a post 206 is set in a base block 207 which is placed on and secured to the table 5 adjacent to the left-hand rear corner of the chute 36. Affixed to the post 206 above the base 207 is a horizontal, supporting bar 208 which is at right-angles to the chute 36. A trip 209 has its rear end mounted on and pivotally connected at 210 with the left-hand end of the bar or support 208. The trip 209 is made angular, or has a bend therein, adjacent to the right-hand end thereof to form what may be termed a cam projection 211 on the front side of said trip, and on the back side of said trip is a rearwardly-extending lug 212. Rising from and rotatably connected with the right-hand terminal of the support 208 is a post 213, which post is supported at the top by an arm 214 having its left-hand end mounted on and rigidly secured to the top of the post 206, and provided at the right-hand end with a vertical screw 215 to engage the upper terminal of the post 213. The post 213 is thus rotatably mounted between the support 208 and the arm 214. Secured to the post 213, adjacent to the upper terminal of said post, is an arm 216 which is provided with a ring-feed finger 217. The arm 216 is located on the side of the post 213 that is adjacent to the cover 134, and the finger 217 is on the right-hand side of said arm adjacent to the forward terminal thereof, and in position to enter an opening 218 in said cover, such opening being directly below the opening 204 in said cover. The finger 217 is of sufficient length to extend across the passage 133 after passing through the opening 218, when the arm 216 is approximately parallel with the cover 134. A spring 219 has one terminal attached to the post 206 and the other terminal attached to the rear end of the arm 216, and normally retains said arm with the finger 217 in contact with the right-hand side of the passage 133. The post 213 has a trip finger 220 extending to the left therefrom into the path of the lug 212.

The trip 209 is directly behind the leading-terminal portion of a spindle at the receiving station, but out of contact therewith or the path thereof. The cam projection 211 of the trip 209 is, however, in the path of a ring 2 mounted on the aforesaid terminal of the spindle at the receiving station or the rearmost spindle. Consequently when the spindle is retracted the ring carried thereby encounters the projection 211, and swings the trip 209 rearwardly on its pivot 210. The lug 212 is carried rearwardly with the trip 209 and actuates the finger 220 in the same direction, and thus causes the post 213 to be partially rotated, and the arm 216, which is rigidly connected with said post, to be actuated, against the resiliency of the spring 219, to an extent sufficient to withdraw the finger 217 from the passage 133, but not far enough to withdraw said finger from the opening 218. As soon as the ring carried by the rearmost spindle passes away from the trip 209, the spring 219 acts to restore the parts to their former positions, with the finger 217 across the passage 133, and the projection 211 in the path of the next ring taken by the next spindle to arrive at the receiving station.

The rings 2 are fed downwardly at the lower terminal of the passage 133 in the following manner, assuming that there is a ring on the locating slide 191 between the locating arms 182 and 183, a ring suspended from the finger 217, and the remaining rings resting upon the ring that is suspended from said finger and upon each other upwardly to the top of the passage 133: The bottommost ring is withdrawn by the rearmost spindle from the locating members for said ring, and causes the finger 217 to be withdrawn from its supporting relationship to the next succeeding ring, which latter immediately drops into the position formerly occupied by said first-named ring. As soon as the ring drops from the finger 217 the ring above drops onto the finger 203 and all the rings above that descend therewith. While the finger 203 is still moving to the left, the finger 217 resumes its former position and passes through what is now the second ring just above the bottom thereof, so that, by the time said finger 203 moves far enough to the left to disengage said ring and permit the same to drop, the finger 217 is in position to receive said ring when it drops and support it at the top in readiness to be dropped subsequently into spindle-receiving position. When the ring drops from the finger 203 the ring above is caught on the finger 199 and supported with the rings above on and by said finger. Upon the movement of the fingers 199 and 203 to the right, the ring suspended from the finger 199 drops from said finger, as the latter passes out of engagement therewith, and descends with the rings above onto the ring supported by the finger 217, the finger 203 meanwhile having passed to the right through the axial center of the ring that is now resting on that which is supported from the finger 217. Thus by a step-by-step movement the rings in the passage 133 are fed to the locating members at the receiving station.

In the event the spindle at the receiving station fail for any reason to take on a ring, the trip 209 is unaffected by the retraction of said spindle, and the finger 217 blocks the passage 133 and prevents another ring from descending, until the trip 209 or the arm 216 is actuated to withdraw said finger from said passage. Thus the finger 217 and the parts and members connected and closely associated with the same serve as a safety device or medium as well as a feeding element.

Having special reference to Figs. 1, 8, and 25 to 32, inclusive, the ring-setting mechanism will now be described.

Mounted and securely bolted or otherwise affixed to the slide 148 is a box 221 having therein a ring spacer 222. In the right-hand side of the box 221 is a horizontal slot 223 which is in the same horizontal plane with the axis of the spacer 222. The box 221 is at the left of the bar 150 and in contact with the left-hand edge of said bar. The spacer 222 is for spacing the rings apart longitudinally on their axes when placed on the bobbin head 1. A spacer plate 224 is set into a horizontal slot in the left-hand end of the ring setter guide 152, and is secured in said slot by means of a vertical pin 225. The left-hand edge of the plate 224 is receivable in the slot 225 in the box 221. A ring setter 226 is slidingly arranged in the left-hand end or head of the guide 152, said setter extending transversely of said guide or longitudinally in said head, the latter being longer than the guide is wide. The bolt 146, after passing upwardly through openings provided to receive the same in the trip bar 144, the spacer block 147, the slide 148, the spacer block 149, and the bar 150, and through the slot 151 in the guide 152, has mounted thereon above said guide a washer 227, and two nuts 228, the upper nut serving as a set-nut. The nuts 228 are not screwed down so tightly onto the washer 227 as to cause the latter to bind on the guide 152 with sufficient force to prevent said guide from being moved longitudinally on the bar 150. The bar 150 is rigidly secured to the slide 148 and serves both as a support and a guide for the ring-setter guide 152. The longitudinal edges of the base of the slide 148 are inclined downwardly and outwardly and received between a guide flange 229 and a gib 230, the former being on the table 5 behind said base, and the latter on said table in front of said base. Vertical gib bolts 231 and horizontal gib bolts 232 are provided for the gib 230 as usual. Mounted on the table 5 in front of the box 221 and the slide 152 is a bar 233 having therein a cam slot 234, the left-hand portion of said slot being adjacent to the head (235) of the guide 152. Depending from the bar 233 at the rear edge thereof and to the left of the box 221 is a lug 236, and pivotally connected at 237 with said lug is a pawl 238. A spring 239 is arranged between the left-hand terminal, which is the tail-end, of the pawl 238, and the bar 233 above, normally to retain the upper edge of said pawl, forward of the vertical plane of the pivot 237, in contact with the underside of the bar 233. From the aforesaid upper edge the pawl 238 extends downwardly and then to the right to provide an operating beak for engagement with a ratchet-wheel 240 secured to the front terminal of the spacer 222. The ratchet-wheel 240 is at the front end of the box 221. The pawl 238 moves only on its pivot 237, while the ratchet-wheel 240 is carried bodily to the right and left with the slide 148. Said pawl is in the path of the ratchet-wheel 240, and causes the latter to be rotated each time the same is carried into contact with said pawl, which occurs every time the slide 148 is moved to the left. The ratchet-wheel 240 is provided with six teeth, one of which encounters the pawl 238, each time the slide 148 is retracted, and one-sixth of a revolution is thus imparted to the spacer 222 by said pawl. At this time the pawl 238 is rocked downwardly on the pivot 237, against the resiliency of the spring 239, by the tooth which follows that engaged by said pawl, a sufficient distance to enable the latter, when the slide 148 is next advanced and the ratchet-wheel 240 moved out of engagement with the pawl, to be positioned by said spring in readiness to engage the next tooth upon the succeeding retraction of said slide. The frictional engagement between the spacer 222 and its bearing parts is sufficient to prevent backlash.

The ring spacer 222 is provided with three sets of contacting faces, such faces in each set being indicated by the numerals 241, 242, and 243. Each face 241 is more remote from the axis of the spacer 222 than is each face 242, and each of the latter is more remote from said axis than is each of the faces 243. These contact faces sequentially engage the plate 224 which projects through the slot 223 in the box 221. Since the plate 224 is attached to the guide 152, and said guide is slidingly arranged on the bar 150, and provided with the slot 151 to accommodate the bolt 146, said guide is advanced farther, when the slide 148 is advanced, by either contact face 241 than it is by either contact face 242, and is advanced the least distance by either contact face 243. By this means and mechanism the three rings 2 are spaced equidistant apart axially on the bobbin head 1, it being understood that there is the same difference between the amount of projection of either contact face 241 and its associated contact face 242 that there is between the latter and the associated contact face 243. The innermost ring 2 on the head 1 is set when one of the contact faces 241 is behind the plate 224, the second ring is set on said head when the succeeding contact face 242 is behind said plate, and the outermost ring is set on said head when the succeeding contact face 243 is behind said plate, and these faces are presented sequentially by the action of the pawl 238 on the ratchet-wheel 240. There are necessarily two sets of contact faces on the spacer 222, because the rings are applied to two bobbins at each complete cycle of the machine.

In the event two instead of three rings are to be set on the bobbin head, the spacer 244 shown in Fig. 32 is substituted for the other. This spacer is provided with two sets of three contact faces, such faces in each set being indicated by the numerals 245 and 246, and the former being the more remote from the axis of the spacer than the latter. This spacer operates in substantially the same manner as the other, but during each complete revolution of the same two rings are set on three bobbins instead of three rings on two bobbins. The spacer in each case is received in a cylindrical opening in the box 221, with the sides of which opening the front end portion, as 247, and the faces 241 or 245 contact, and such spacer has at the rear end a trunnion 248 that is received in a bearing or bushing 249 in the rear end of the aforesaid cylindrical opening.

The ring setter 226 is a plate having at its front end a fork 250 in the arms of which is a vertical spindle 251 that carries a roll 252. The arms of the fork 250 pass above and below, respectively, the cam plate 233, and the roll 252 is in the cam slot 234. When the slide 148 is retracted, the setter 226 is actuated forwardly, through the medium of the roll 252 in the cam slot 234, and, when said slide is actuated to the right, said setter is actuated rearwardly, through the same medium as before. In the rear terminal of the setter 226 is a recess 253 which is of a size and shape that enables such terminal partially to embrace or encircle the split terminal of a spindle at the delivery station. The setter 226 initially assumes operative position each time at the left of or behind the ring 2 on the spindle. The mechanism is so timed that the setter 226 is actuated rearwardly after a spindle has arrived at the delivery station, and is actuated forwardly before said spindle leaves said station. The recess 253 is small enough to enable the ring on the spindle at the delivery station to be engaged by said setter, when the latter is moved to the right from initial position. When the slide 148 is advanced, the setter 252 is carried laterally with it, the distance of such movement of said setter being in a certain limited degree determined by the relative position of the spacer 222 to the plate 224, as explained above. During the forward or advance movement laterally of the setter 226, said setter encounters the ring 2 which is in its path and forces the same off of the spindle and onto the head of the bobbin that is in position to receive said ring. The setter is always retracted laterally far enough to insure the positioning of the rear-terminal portion of said setter behind the ring, upon the rearward, longitudinal movement of the setter.

A tail-stock 254 is mounted on the table 5 in guides 255—255, with its axis directly in line with a spindle at the delivery station, and at the right of such station, as shown in Figs. 1 and 8. Rising from the table 5 at the left of the tail-stock 254 is a vertically adjustable, bobbin rest 256, and a similar rest rises from said table at the right of the delivery station. The rests 256 have their upper terminals forked to form open-top crotches or seats for a bobbin. The bobbin is introduced from above into the aforesaid seats. The tail-stock is held stationary by means of bolts 257 which pass downwardly through the base of said tail-stock into the table, and said tail-stock can be adjusted to the right or left, when said bolts are loosened, by means of a screw 258 which is tapped into a lug 259 on said table at the right of said base. This adjustment is necessary for the accommodation of bobbins of different lengths. The tail-stock is provided with a spindle 260 that is split at the left-hand terminal to be received in the right-hand end of the passage through a bobbin and frictionally engage the bobbin so that the same can be rotated with said spindle. A bevel-gear 261 is secured to the spindle 260 at the right-hand end thereof. Intermeshing with the bevel-gear 261 is a bevel-gear 262 which is secured on the upper terminal of a shaft 263 journaled in the base of the tail-stock 254.

A plate 264 is secured to the underside of the trip bar 144, and a ratchet-wheel 265 is secured to the lower terminal of the shaft 263, as shown in Fig. 25. The plate 264 is at the right of the ratchet-wheel 265, and a pawl 266 has its right-hand terminal pivoted at 267 to said plate behind the trip bar 144. The pawl 266 is provided on the back edge with a plurality of teeth to engage the ratchet-wheel 265, and a spring 268 is arranged to retain said pawl in engagement with said ratchet-wheel. The plurality of teeth is provided in order to enable the tailstock 254 to be adjusted without disengaging the ratchet-wheel 265 from said pawl.

The construction and timing of the parts are such that, each time the trip bar 144 is actuated to the left, one-third of a revolution is imparted, through the medium of the pawl 266, the ratchet-wheel 265, the shaft 263, and the bevel-gears 262 and 261, to the spindle 260. The spindle 260 carries with it the attached bobbin and imparts to the same one-third of a revolution after the first ring has been set on the head thereof, and again after the second ring has been set on said head, consequently all three rings are set with their joints equidistant apart circumferentially, inasmuch as said joints are always in a predetermined position circumferentially at the time each ring is forced off of the spindle at the delivery station by the setter 226.

Bevel-gears having a different ratio from the bevel-gears 262 and 261 may be substituted for the latter when two rings are to be set instead of three. In the event only one ring is to be set, it is not necessary to rotate the bobbin. Furthermore, a rotatable spacer, such as the spacer 222 or 244, is not needed for setting a single ring only on a bobbin.

The operation of the machine as a whole is described as follows, assuming that the reciprocating parts and members are in their advanced positions as illustrated in the drawings:

In describing the operation I will start with the spindle which is at the receiving station and follow the same generally throughout a complete cycle of the machine, referring to the other spindles only as may incidentally be necessary. The spindle at the receiving station has been thrust into and through the lowermost ring 2 and partially expanded by the plunger 125. The carriage 65 is retracted directly after the ring is firmly seated on the spindle, and said spindle is retracted with said carriage. The Geneva movement imparts one-sixth of a revolution to the turret 92, and then said carriage is advanced and forces the spindle against the expander 177. This action causes the ring to be expanded and the joint 3 therein to be opened. Again the carriage and spindle are retracted, and a second time the turret 92 has one-sixth of a revolution imparted thereto. As the spindle is carried by the turret through the second one-sixth of the revolution, the spindle is revolved by the band 112, and the latch 104 which is adjacent to the ring enters the joint 3 at some time during such revolution of said spindle, and locates said joint in the predetermined position necessary in order to present said joint in proper position to the bobbin, or in the same position as all other ring joints are presented. As soon as the latch 104 enters the joint 3 further independent rotation of the spindle ceases, the spindle collar 123 then sliding beneath the band 112 without rotation. The carriage and spindle are advanced and retracted at the end of the second one-sixth of the revolution of the turret, before which time the latch is actuated out of engagement with the ring, and, while the spindle is in retracted position this time, the turret has imparted thereto the third one-sixth of the revolution and carries said spindle to the delivery station. During this dwell (at the delivery station) of the turret the carriage and spindle are advanced, and the head of the spindle screw 117 enters the left-hand end of the passage in the bobbin already in engagement with the tail-stock spindle 260 and supported by the rests 256. Directly the aforesaid screw head enters the bobbin, the outer end of the spindle cone 115 contacts with the adjacent end of said bobbin, and all is in readiness for the ring on the spindle to be transferred from the same onto the bobbin head 1. This action immediately occurs and is brought about by the advance of the slide 148 and of the ring setter 226, the latter meanwhile having been moved into position behind the ring. Then the slide 148 is retracted and with it the setter 226, the ratchet operated by the trip bar 144 that is connected with said slide causes one-third of a revolution to be imparted to the bobbin, and the carriage and spindle are retracted. Also the setter 226 is drawn forward out of the path of the spindle. While in retracted position the spindle is carried by the turret through the fourth one-sixth of the revolution or of its orbit, and the head 121 of said spindle encounters the cam 89. During the next two-sixths of the revolution or orbit of the spindle, the cam 89 causes said spindle to be contracted, so that, by the time the same arrives again at the receiving station, it is ready to be received by and take another ring. The head 121 rides clear of the cam 89 during the passage of the spindle through the last one-sixth of its orbit.

While the spindle is passing from the delivery station to the receiving station it is advanced and retracted twice, but these movements so far as this spindle is concerned produce no effect. The spindle arrives at the receiving station while in retracted position, but the same is immediately advanced to take its second ring. Meanwhile the rings have been fed down into the locating members as each succeeding spindle has arrived at the receiving station and removed a ring therefrom.

It is assumed that the innermost ring 2 has been set on the bobbin head 1 during the operation just described. Upon the retraction of the slide 148 one-third of a revolution is imparted to the spacer 222, and the spindle following that first considered carries the second ring for the bobbin and the same is in due time set thereon. The third spindle in succession carries the third ring and this in turn is set on the bobbin. As soon as the third ring is set, the bobbin is lifted out of the seats at the top of the rests 256 and disengaged from the spindle 260, and another bobbin is placed in position to receive its three rings. These are set by the fourth, fifth, and sixth spindles in succession.

What I claim as my invention, and desire to secure by Letters Patent, is—

1. In a ringing machine of the class described, ring-locating means, bobbin-positioning means, and a spindle movable from an operative position relative to said first-named means to an operative position relative to said second-named means, and adapted to take a ring from said first-named means.

2. In a ringing machine of the class described, ring-locating means, bobbin-positioning means, an expanding and collapsing spindle movable from an operative position relative to said ring-locating means to an operative position relative to said bobbin-positioning means, and adapted to take a ring from said first-named means.

3. In a ringing machine of the class decribed, ring-locating means, bobbin-positioning means, an expanding and collapsing spindle movable from an operative position relative to said ring-locating means to an operative position relative to said bobbin-positioning means, and adapted to take a ring from said first-named means, and means partially to expand said spindle at said first-named position.

4. In a ringing machine of the class described, ring-locating means, bobbin-positioning means, an expanding and collapsing spindle movable from an operative position relative to said ring-locating means to an operative position relative to said bobbin-positioning means, and adapted to take a ring from said first-named means, means partially to expand said spindle at said first-named position, and means further to expand said spindle and ring thereon at a point intermediate of said first- and second-named positions.

5. In a ringing machine of the class described, ring-locating means, bobbin-positioning means, an expanding and collapsing spindle movable from an operative position relative to said ring-locating means to an operative position relative to said bobbin-positioning means, and adapted to take a ring from said first-named means, means to expand said spindle and ring thereon, and means to locate the joint in said ring in a predetermined position while said spindle is moving between said positions.

6. In a ringing machine of the class described, ring-locating means, bobbin-positioning means, a spindle movable from an operative position relative to said first-named means to an operative position relative to said second-named means, and adapted to take a ring from said first-named means, and means to transfer the ring carried by said spindle onto a bobbin carried by said second-named means.

7. In a ringing machine of the class described, ring-locating means, bobbin-positioning means, an expanding and collapsing spindle movable from an operative position relative to said first-named means to an operative position relative to said second-named means, and adapted to take a ring from said first-named means, and means to force said ring from said spindle onto a bobbin carried by said second-named means.

8. In a ringing machine of the class described, ring-locating means, bobbin-positioning means, an expanding and collpasing spindle movable from an operative position relative to said first-named means to an operative position relative to said second-named means, and adapted to take a ring from said first-named means, means to expand said spindle and ring, and means to force said ring from said spindle onto a bobbin carried by said second-named means.

9. In a ringing machine of the class described, ring-locating means, bobbin-positioning means, intermittently operating means for the partial rotation of a bobbin carried by said second-named means, a spindle movable from an operative position relative to said first-named means to an operative position relative to said second-named means, and adapted to take a ring from said first-named means, means to locate in a predetermined position the joint in said ring, and means to transfer said ring from said spindle to a bobbin carried by said second-named means.

10. In a ringing machine of the class described, ring-locating means, bobbin-positioning means, a spindle movable from an operative position relative to said first-named means to an operative position relative to said second-named means, and adapted to take a ring from said first-named means, and means having a varying length of stroke to transfer the ring carried by said spindle onto a bobbin carried by said second-named means.

11. In a ringing machine of the class described, a plurality of ring spindles, means to reciprocate said spindles, means intermittently to carry said spindles through an orbital path, a receiving station, a delivery station, and means simultaneously to cause a spindle at the receiving station to take a ring and a ring to be removed from a spindle at the delivery station.

12. In a ringing machine of the class described, a plurality of expanding and contracting spindles, means to reciprocate said spindles, means intermittently to carry said spindles through an orbital path, a receiving station, a delivery station, expanding means for said spindles, means to cause a spindle at the receiving station to take a ring, means to cause a spindle with its ring, after said last-named spindle has passed said receiving station, to be expanded, and means to force a ring off of a spindle at the delivery station, the receiving, expanding, and delivering operations occurring approximately simultaneously.

13. In a ringing machine of the class described, ring-locating means, bobbin-positioning means, an expanding and collapsing spindle movable from an operative position relative to said ring-locating means to an operative position relative to said bobbin-positioning means, and adapted to take a ring from said first-named means, means to expand said spindle and ring, and means to force the expanded ring from said spindle at said second-named position.

14. In a ringing machine of the class described, ring-locating means, bobbin-positioning means, means intermittently partially to rotate said last-named means, an expanding and collapsing spindle movable from an operative position relative to said ring-locating means to an operative position relative to said bobbin-receiving means, and adapted to take a ring from said first-named means, means to expand said spindle and ring, means to locate in a predetermined position the joint in said ring, means to force said expanded ring from said spindle onto a bobbin carried by said second-named means, and means intermittently to rotate said bobbin.

15 In a ringing machine of the class described, ring-locating means, bobbin-positioning means, an expanding and collapsing spindle movable from an operative position relative to said ring-locating means to an operative position relative to said bobbin-positioning means, and adapted to take a ring from said first-named means, means to expand said spindle and ring, and means having a varying length of stroke to force said expanded ring from said spindle onto a bobbin carried by said second-named means.

16. In a ringing machine of the class described, ring-locating means, bobbin-positioning means, an expanding and collapsing spindle movable from an operative position relative to said ring-located means to an operative position relative to said bobbin-receiving means, and adapted to take a ring from said first-named means, means to expand said spindle and ring, means to locate in a predetermined position the joint in said ring, and means having a varying length of stroke to force said expanded ring from said spindle onto a bobbin carried by said second-named means, and means intermittently to rotate said bobbin.

17. In a ringing machine of the class described, a ring spindle, means to reciprocate said spindle, intermittent means to move said spindle through an orbital path, a receiving station for supplying a ring to said spindle when located at one point in said path, and a delivery station for removing a ring from said spindle when located at another point in said path.

18. In a ringing machine of the class described, a plurality of ring spindles, means to reciprocate said spindles, means intermittently to carry said spindles through an orbital path, a receiving station to supply said spindles with rings when they arrive at said station, and a delivery station where the rings carried by said spindles are removed upon the arrival of the spindles at said last-named station.

19. In a ringing machine of the class described, a ring spindle, means to reciprocate said spindle, means intermittently to carry said spindle through an orbital path, means at one point in said path to supply said spindle with a ring, and means at another point in said path to remove said ring from said spindle.

20. In a ringing machine of the class described, an expanding and contracting spindle, means to reciprocate said spindle, means intermittently to carry said spindle through an orbital path, means at one point in said path to supply said spindle with a ring, means at another point in said path to expand said spindle and ring, and means at still another point in said path to remove said ring from said spindle.

21. In a ringing machine of the class described, an expanding and contracting spindle, means to reciprocate said spindle, means intermittently to carry said spindle through an orbital path, means at one point in said path to supply said spindle with a ring, means at another point in said path to expand said spindle and ring, means to rotate said spindle independently on its own axis after the same is expanded, and means at still another point in said path to remove said ring from said spindle.

22. In a ringing machine of the class described, an expanding and collapsing spindle, means to reciprocate said spindle, means intermittently to carry said spindle through an orbital path, means at one point in said path to supply said spindle with a ring, means at another point in said path to expand said spindle and ring, means at still another point in said path to remove said ring from said spindle, and means subsequently to cause said spindle to be collapsed while moving through said path.

23. In a ringing machine of the class described, an expanding and collapsing spindle, means to reciprocate said spindle, means intermittently to carry said spindle through an orbital path, means at one point in said path to supply said spindle with a ring, means at another point in said path to expand said spindle and ring, means to rotate said spindle independently on its own axis after the same is expanded, means at still another point in said path to remove said ring from said spindle, and means subsequently to cause said spindle to be collapsed while moving through said path.

24. In a ringing machine of the class described, means to support a bobbin in a horizontal position, and automatic means to receive and carry rings and progressively set them on a bobbin carried by said supporting means.

25. In a ringing machine of the class described, means to support a bobbin in a horizontal position, and automatically reciprocating and intermittently rotating means to set a ring on a bobbin carried by said supporting means.

26. In a ringing machine of the class described, reciprocating and intermittently rotating means progressively to set rings on bobbins, circumferentially adjusting means to locate each ring with its joint in a predetermined position, and automatic means intermittently to rotate each bobbin whereby the rings on each bobbin are positioned with their joints in offset relationship.

27. In a ringing machine of the class described, means progressively to set rings on bobbins, rotating adjusting means to locate each ring with its joint in a predetermined position, and automatic means intermittently to rotate each bobbin, whereby the rings on each bobbin are positioned with their joints in offset relationship.

28. In a ringing machine of the class described, a spindle comprising a tube adapted to be expanded and contracted at one terminal, and to receive a ring on such terminal, and an expanding member for said terminal.

29. In a ringing machine of the class described, a spindle comprising a tube split at one terminal to render the same expansible and contractible, and a spindle slidingly arranged in said tube, said spindle having an expanding cone in said split terminal, and a head which is outside of said tube.

30. In a ringing machine of the class described, a spindle comprising a tube split at one terminal to render the same expansible and contractible, a spindle slidingly arranged in said tube and provided with an expanding cone in said terminal, and a centering member at the outer end of said cone, said member being adapted to be received in the passage of a bobbin.

31. The combination, in a ringing machine of the class described, with a reciprocating member, and a rotary member, of a spindle slidingly arranged in said rotary member, and connected with said reciprocating member, whereby said spindle has imparted thereto a reciprocating movement and a movement through an orbital path.

32. The combination, in a ringing machine of the class described, with a shaft, a turret secured to said shaft, a reciprocating carriage, and a tube-race secured to said carriage, of an expanding and contracting spindle slidingly mounted in said turret, and having a head which is received in said tube-race, whereby said spindle has imparted thereto both reciprocating and orbital movements.

33. The combination, in a ringing machine of the class described, with a shaft, a turret secured to said shaft, a reciprocating carriage, and a tube-race secured to said carriage, said tube-race being provided with a cam, of a tube mounted to slide in said turret, and having at one terminal a head which is received in said tube-race, and being split at the other terminal to render the same expansible and contractible, and a spindle slidingly arranged in said tube and having at one end a head which is in said tube-race, and at the other end an expanding and contracting cone for said split terminal, said cam being in the path of said spindle head.

34. The combination, in a ringing machine of the class described, with a shaft, a turret secured to said shaft, a reciprocating carriage, and a tube-race secured to said carriage, said tube-race having a cam therein, of a tube slidingly arranged in said turret, and having at one terminal a head which is received in said tube-race, the other terminal of said tube being split to render the same expansible and contractible, a spindle slidingly arranged in said tube, and having at one end a head which is in said tube-race, and at the other end an expanding and contracting cone for said split terminal, said cam being in the path of said spindle head, and an expanding member fixed in the path of said cone when said tube with said cone arrives at a predetermined point in its orbit and is advanced, said spindle head then being remote from said cam.

35. The combination, in a ringing machine of the class described, with a shaft, a turret secured to said shaft, a reciprocating carriage, and a tube-race secured to said carriage, said tube-race being provided at one side with outer and inner collars, and having an opening in the opposite side, of a spindle slidingly mounted in said turret, and provided at one terminal with a head which is in said tube-race, and being split at the other terminal to render the same expansible and contractible, the size and shape of said opening and said head being such that the latter may be passed out through the former and the spindle withdrawn from said turret and tube-race.

36. The combination in a ringing machine of the class described, with a shaft, a cam secured to said shaft, and an oscillatory lever operated by said cam, of a sliding carriage, an adjustable connection between said lever and said carriage, a second shaft, a turret secured to said second shaft, and a spindle slidingly mounted in said turret and operatively connected with said carriage, whereby said spindle is reciprocated and caused to move through an orbital path.

37. The combination, in a ringing machine of the class described, with a shaft, cams mounted on said shaft, oscillatory levers operated by said cams, a carriage operatively connected with one of said levers, and a slide operatively connected with the other of said levers, of a second shaft, a turret secured to said second shaft, an expanding and contracting spindle slidingly arranged in said turret and operatively connected with said carriage, whereby said spindle is reciprocated and caused to move through an orbital path, and expanding means for said spindle, said means being operatively located relative to the orbital path through which the forward end of said spindle passes, and operated by said slide.

38. The combination, in a ringing machine of the class described, with a shaft, cams mounted on said shaft, oscillatory levers operated by said cams, a carriage operatively connected with one of said levers, and a slide operatively connected with the other of said levers, of a second shaft, a turret secured to said second shaft, a spindle slidingly arranged in said turret and operatively connected with said carriage, whereby said spindle is reciprocated and caused to move through an orbital path, and ring-setting mechanism carried by said slide.

39. The combination, in a ringing machine of the class described, with a shaft, cams mounted on said shaft, oscillatory levers operated by said cams, a carriage operatively connected with one of said levers, a slide, and an adjustable connection between said slide and the other of said levers, of a second shaft, a turret secured to said second shaft, a spindle slidingly arranged in said turret and operatively connected with said carriage, whereby said spindle is reciprocated and caused to move through an orbital path, and ring-setting mechanism carried by said slide.

40. The combination, in a ringing machine of the class described, with a shaft, cams mounted on said shaft, oscillatory levers operated by said cams, a carriage operatively connected with one of said levers, and a slide operatively connected with the other of said levers, of a second shaft, a turret secured to said second shaft, a spindle slidingly arranged in said turret and operatively connected with said carriage, whereby said spindle is reciprocated and caused to move through an orbital path, and ring-spacing and -setting mechanism carried by said slide.

41. The combination, in a ringing machine of the class described, with an intermittently-rotating shaft, a turret secured on said shaft, a reciprocating carriage, an expanding and contracting spindle slidingly arranged in said turret and operatively connected with said carriage, whereby said spindle is reciprocated and caused to pass through an orbital path, and a reciprocating slide, of expanding means operatively located relative to the orbital path at the forward end of said spindle, and means to operate said expanding means from said slide when the latter advances.

42. The combination, in a ringing machine of the class described, with an intermittently-rotating shaft, a turret secured to said shaft, a reciprocating carriage, and a spindle slidingly arranged in said turret and operatively connected with said carriage, whereby said spindle is reciprocated and caused to pass through an orbital path, of a reciprocating slide provided with means to remove a ring from said spindle.

43. The combination, in a ringing machine of the class described, with an intermittently-rotating shaft, a turret secured to said shaft, a reciprocating carriage, and a spindle slidingly arranged in said turret and operatively connected with said carriage, whereby said spindle is reciprocated and caused to pass through an orbital path, of a reciprocating slide provided with means to remove a ring from said spindle, when it arrives at a certain point in its orbital path.

44. The combination, in a ringing machine of the class described, with an intermittently-rotating shaft, a turret secured on said shaft, a reciprocating carriage, and a spindle slidingly arranged in said turret and operatively connected with said carriage, whereby said spindle is reciprocated and caused to pass through an orbital path, of ring-spacing and -setting mechanism in operative position relative to said spindle, when it arrives at a certain point in its orbital path.

45. The combination, in a ringing machine of the class described, with an intermittently-rotating shaft, a turret secured to said shaft, a reciprocating carriage, and a spindle slidingly arranged in said turret and operatively connected with said carriage, whereby said spindle is reciprocated and caused to pass through an orbital path, of a reciprocating slide provided with ring-spacing and -setting mechanism in operative position relative to said spindle, when it arrives at a certain point in its orbital path.

46. In a ringing machine of the class described, a rotatable turret, an expanding and contracting spindle carried by said turret, means to rotate said spindle in said turret during the passage of said spindle through a portion of its orbital path, and means to engage the joint in a ring carried by said spindle and prevent further independent rotation thereof.

47. In a ringing machine of the class described, a rotatable turret, an expanding and contracting spindle carried by said turret, means to impart a complete revolution to said spindle on its own axis, and means to engage a ring mounted on said spindle and hold the same against further independent rotation.

48. In a ringing machine of the class described, a rotatable turret, a ring spindle mounted in said turret, and friction means to cause said spindle to rotate on its own axis while passing through a portion of its orbital path, of means to engage a ring on said spindle, while the latter is subject to said friction means, and hold said ring and spindle against further independent rotation.

49. The combination, in a ringing machine of the class described, with a rotatable turret, a ring spindle mounted in said turret, and a friction band bounding a portion of the orbital path of said spindle, whereby the spindle is caused to rotate by said band, of means to engage a ring on said spindle and hold the same against further movement imparted thereto by said band.

50. The combination, in a ringing machine of the class described, with a rotatable turret, a ring spindle mounted in said turret, and means to rotate said spindle on its own axis while passing through a portion of its orbital path, of a latch and a dog carried by said turret, said latch being adjacent to a ring on said spindle, a cam in the path of said dog, and means to retain said dog in engaging relation to said cam, the arrangement and construction of parts being such that, when said dog is permitted by said cam to swing toward the axis of said turret, said latch is actuated against said ring and engaged by the joint therein, whereby the independent rotation of said ring and spindle is arrested.

51. The combination, in a ringing machine of the class described, with a rotatable turret, a ring spindle mounted in said turret and provided with a collar, a friction band arranged in a portion of the orbital path of said spindle in position to be contacted with by said collar, of a latch and a dog carried by said turret, said latch being adjacent to a ring on said spindle, a cam in the path of said dog, and means to retain said dog in engaging relation to said cam, the construction and arrangement of parts being such that, when said dog is permitted by said cam to swing toward the axis of said turret, said latch is actuated against said ring and engaged by the joint therein, whereby the independent rotation of said ring and spindle is arrested.

52. The combination, in a ringing machine of the class described, with a turret, means intermittently to rotate said turret, a ring spindle mounted in said turret, such spindle having a part adapted to engage a friction band, and a friction band positioned in a portion of the orbit of said spindle, of a latch and a dog carried by said turret, said latch being adjacent to a ring on said spindle, a cam in the path of said dog, and means to retain said dog in engaging relation with said cam, the arrangement and construction of parts being such that said cam permits said dog to swing toward the axis of said turret after said spindle commences to rotate under the influence of said band, and said cam causes said dog to swing in the opposite direction before said spindle passes beyond the influence of said band, said latch meanwhile being rocked into contact with the ring on said spindle, engaging the joint in said ring, arresting the independent rotation of said ring and spindle, and rocked back to disengaging and non-contacting position.

53. The combination, in a ringing machine of the class described, with a turret, of a spindle journaled in said turret, and provided with a head, and a dog and a latch projecting from said head.

54. The combination, in a ringing machine of the class described, with a turret, and a cam, of spindles journaled in said turret, and provided with heads, pins extending through said spindles at the ends opposite said heads, dogs projecting from said head and adapted to contact with said cam, ring-engaging latches also projecting from said heads, and a spring extending between said pins and arranged and adapted to retain said dogs in operative relation to said cam.

55. In a ringing machine of the class described, a ring spindle, means to reciprocate and carry said spindle through an orbital path in which there are dwells, and means to locate a ring in position to be taken by said spindle when the latter arrives in ring-receiving position, said last-named means consisting in part of a member which yields in the event said ring jams between said spindle and said member.

56. The combination, in a ringing machine of the class described, with a ring spindle, and means to reciprocate and intermittently rotate said spindle through an orbital path in which there are dwells, of locating means for a ring, said locating means consisting in part of a yielding support having its axis in line with the axis of said spindle when the latter arrives in ring-receiving position.

57. The combination, in a ringing machine of the class described, with a ring spindle, and means to reciprocate and intermittently to rotate said spindle through an orbital path in which there are dwells, of a ring chute having a passage therein, locating means in said passage for the lowermost ring therein, whereby said ring is positioned with its axis in line with the axis of said spindle when the latter arrives in ring-receiving position, and a safety plug yieldingly supported with its head in position to serve as an abutment for such ring.

58. In a ringing machine of the class described, an expanding and contracting spindle for rings, means to reciprocate and to carry said spindle through an orbital path in which there are dwells, means to locate a ring in position to receive the forward terminal of said spindle, when the latter arrives in ring-receiving position, and means at such time partially to expand such spindle.

59. In a ringing machine of the class described, an expanding and contracting spindle for rings, means to reciprocate and to carry said spindle through an orbital path in which there are dwells, means to locate a ring in position to receive the forward terminal of said spindle, when the latter arrives in ring-receiving position, and a reciprocating plunger arranged with its axis in line with the axis of said spindle when in said position, and adapted to cause the spindle to be expanded within said ring.

60. In a ringing machine of the class described, an expanding and contracting spindle for rings, means to reciprocate and to carry said spindle through an orbital path in which there are dwells, means to locate a ring in position to receive the forward terminal of said spindle, when the latter arrives in ring-receiving position, a spring-pressed expanding plunger arranged with its axis in line with the axis of said spindle when in said position, and means to actuate said plunger toward said spindle.

61. In a ringing machine of the class described, an expanding and contracting spindle, means to reciprocate and to carry said spindle through an orbital path in which there are dwells, means to locate a ring in position to be taken by said spindle when the same arrives at ring-receiving position, said locating means consisting in part of a spring-pressed plug, a spring-pressed plunger slidingly arranged in said plug in position to act on said spindle to expand the same, and means to force said plunger toward said spindle.

62. The combination, in a ringing machine of the class described, with an expanding and contracting spindle, and means to reciprocate and to carry said spindle through an orbital path in which there are dwells, of means to locate a ring in position to be taken by said spindle when the latter arrives in receiving position, a spring-pressed expanding plunger having its axis in line with the axis of said spindle, when the latter is in said position, a shaft, arms rigidly connected with said shaft, one of said arms having its free end in operative position relative to said plunger, and a reciprocating trip bar provided with a block, the other of said arms being in the path of said block.

63. The combination, in a ringing machine of the class described, with an expanding and contracting spindle, and means to reciprocate and to carry said spindle through an orbital path in which there are dwells, of means to locate a ring in position to be taken by said spindle when the latter arrives in receiving position, a spring-pressed expanding plunger having its axis in line with the axis of said spindle, when the latter is in said position, a shaft, arms rigidly connected with said shaft, one of said arms having its free end in operative position relative to said plunger, a trip bar provided with a block, the other of said arms being in the path of said block, and means to actuate said trip bar in the direction to operate said arms and cause said plunger to be thrust toward said spindle, at approximately the same time said spindle is advanced in said position.

64. In a ringing machine of the class described, an expanding and contracting spindle, means to reciprocate said spindle and to carry the same through an arcuate path and produce dwells therein, means to locate a ring in position to be taken by said spindle when it is in ring-receiving position, and means to expand said spindle sufficiently to enable the same to remove said ring from said locating means.

65. The combination, in a ringing machine of the class described, with locating means for a ring, said means consisting in part of arms having oppositely disposed jaws, means to retain said arms in ring-engaging position, an expanding and contracting spindle capable of having its forward end passed through said ring, and means to expand said spindle to enable the same to withdraw said ring from said locating means.

66. In a ringing machine of the class described, locating means for a ring, such means comprising a yielding locating slide, arms yieldingly held in ring-engaging position, an expanding and contracting spindle capable of having its forward end passed through said ring, and means to expand said spindle to enable the same to withdraw said ring from said locating means.

67. In a ringing machine of the class described, an expanding and contracting spindle, means to reciprocate and to carry said spindle through an orbital path and produce dwells in such path, said spindle having an expanding cone, and an expander fixed in the path of said cone, when said spindle arrives opposite to said expander and is advanced.

68. In a ringing machine of the class described, an expanding and contracting spindle consisting in part of a cone, means to reciprocate and to carry said spindle through an orbital path and to produce dwells in such path, an expanding plunger arranged with its axis in line with the axis of said spindle, when the latter arrives opposite to said plunger, means to force said plunger against said cone, and a fixed expander in position to cause said cone to be forced inwardly, when said spindle arrives opposite to said fixed expander and is advanced.

69. In a ringing machine of the class described, an expanding and contracting spindle consisting in part of a cone, means to reciprocate and to carry said spindle through an orbital path and to produce dwells in such path, and means progressively to force said cone into expanding position during the reciprocating and orbital movements of said spindle.

70. In a ringing machine of the class described, expanding and contracting spindles each consisting in part of a cone, means to reciprocate and to carry said spindles through an orbital path and produce dwells in such path, and an expanding plunger and a fixed expander arranged and adapted to force the cones into expanding position when said spindles arrive opposite to said plunger and expander, respectively, and are advanced.

71. In a ringing machine of the class described, a chute having a passage for rings therein, and locating means for a ring in said passage, such means comprising members having jaws which extend into said passage and are adapted to engage and hold a ring therein.

72. In a ringing machine of the class described, a chute having a passage for rings therein, a bottom locating member for a ring in said passage, and locating members having jaws which extend into said passage and are adapted to engage a ring therein.

73. In a ringing machine of the class described, a chute having a passage for rings therein, a bottom locating member for a ring in said passage, swinging locating arms having jaws which extend into said passage and are adapted to engage a ring therein, a spring arranged to actuate said arms toward each other, and means to limit such movement of said arms.

74. In a ringing machine of the class described, a chute having a passage therein for rings, a locating slide to support the bottom of a ring in said passage, locating arms pivotally connected with said chute and having jaws which extend into said passage and are adapted to engage a ring therein, lugs on said arms, bolts tapped into said lugs and adapted to engage said chute to limit the movement of said arms toward each other, and a spring arranged normally to retain said arms with said bolts in contact with said chute.

75. In a ringing machine of the class described, a chute having a passage therein for rings, an upwardly spring-pressed locating slide in said chute, means to limit the upward movement of said slide, and locating means to engage a ring on said slide at opposite sides.

76. In a ringing machine of the class described, a chute having a passage therein for rings, means to supply said chute with rings, and means to feed said rings downwardly in said passage by a step-by-step movement, said last-named means comprising three cooperating members which are actuated into and out of said passage.

77. In a ringing machine of the class described, a chute having a ring passage therein, a ring hopper, means to deliver rings from said hopper to said passage, and means to feed said rings downwardly in said passage by a step-by-step movement, said last-named means comprising three cooperating members which are actuated into and out of said passage.

78. In a ringing machine of the class described, an approximately vertical chute having a ring passage therein, a ring hopper and a case supported in operative position relative to said passage, said hopper having a bottom opening therein, and a rotating feed roll mounted in said case, with a portion of the periphery of said roll in said opening, and adapted to agitate the rings in said hopper and assist in delivering the same to said passage, the axis of said roll being approximately at right-angles to said chute, but in a plane approximately parallel with the breadthwise plane of said passage.

79. In a ringing machine of the class described, a chute having a ring passage therein, a ring hopper and a case supported in operative position relative to said passage, and a rotating feed roll mounted in said case and adapted to agitate the rings in said hopper and assist in delivering the same to said passage, said feed roll comprising a drum, and a plurality of radial spring-pressed pins arranged in and projecting beyond the periphery of said drum.

80. In a ringing machine of the class described, a chute having a ring passage therein, a ring hopper and a case supported in operative position relative to said passage, a revolving sorter arranged with its axis approximately at right-angles to said chute, and having an annular ring passage therein, and mounted in operative position relative to said first-named passage.

81. In a ringing machine of the class described, a chute having a ring passage therein, a ring hopper and a case supported in operative position relative to said passage, a shaft journaled in said case, a feed roll secured to said shaft and adapted to agitate the rings in said hopper and assist in delivering the same to said passage, a driven shaft also journaled in said case, means to drive said first-named shaft from said second-named shaft, and a sorter secured on said second-named shaft, and having therein an annular ring passage in operative position relative to said first-named passage.

82. The combination, in a ringing machine of the class described, with a ring spindle, and means to reciprocate and to carry said spindle through an orbital path and produce dwells in such path, of a chute having a ring passage therein, ring-locating members in said passage, said members being adapted to support a ring in position to be taken by said spindle when in ring-receiving position, feed fingers adapted to cut across said passage at different elevations, and means to reciprocate said fingers with said spindle, the arrangement and construction of said fingers being such that rings in said passage are sequentially fed downwardly thereby.

83. The combination, in a ringing machine of the class described, with a ring spindle, and means to reciprocate and to carry said spindle through an orbital path and produce dwells in such path, of a chute having a ring passage therein, ring-locating members in said passage, said members being adapted to support a ring in position to be taken by said spindle when in ring-receiving position, feed fingers adapted to cut across said passage at different elevations, means to reciprocate said fingers with said spindle, a third feed finger below the other two, means normally to retain said third finger in position across said passage, the arrangement and construction of said fingers being such that rings in said passage are sequentially fed downwardly thereby, and means to withdraw said third finger from said passage and permit the ring supported thereby to drop into engagement with said locating means, such withdrawing means being automatically operated only by a ring removed by said spindle from said locating means.

84. The combination, in a ringing machine of the class described, with a ring spindle, and means to reciprocate and to carry said spindle through an orbital path and produce dwells in such path, of a chute having a ring passage therein, ring-locating members in said passage, said members being adapted to support a ring in position to be taken by said spindle when in ring-receiving position, feed fingers adapted to cut across said passage at different elevations, means to reciprocate said fingers with said spindle, a third feed finger below the other two, means normally to retain said third finger in position across said passage, the arrangement and construction of said fingers being such that rings in said passage are sequentially fed downwardly thereby, and means to withdraw said third finger from said passage and permit the ring supported thereby to drop into engagement with said locating means, such withdrawing means being automatically operated only by a ring removed by said spindle from said locating means, but capable of being operated by hand.

85. In a ringing machine of the class described, a chute having a ring passage therein, ring-locating means in said passage, step-by-step means for feeding rings in said passage above said locating means, a spindle adapted normally to take a ring from said locating means, and means to hold back the column of rings in said passage in the event said spindle fail to take its ring.

86. In a ringing machine of the class described, a chute having a ring passage therein, ring-locating means in said passage, step-by-step means for feeding rings in said passage above said locating means, a spindle adapted normally to take a ring from said locating means, and means to hold back the column of rings in said passage in the event said spindle fail to take its ring, said last-named means being adapted to be operated by hand to release said column of rings.

87. The combination, in a ringing machine of the class described, with a chute having a ring passage therein, and ring-locating means in said chute, of a reciprocating carriage, a rod connected with said carriage, and provided with upper and lower feed fingers arranged to intersect said passage from opposite directions, a shaft, a turret secured on said shaft, a spindle carried by said turret and operatively connected with said carriage, said spindle when it arrives opposite to said locating means being adapted to take a ring therefrom, a third feed finger below said first-named fingers, and normally extending across said passage, and means in the path of the ring taken by said spindle to cause said third finger to be withdrawn from said passage.

88. In a ringing machine of the class described, a chute having a ring passage therein, a reciprocating member, a rod carried by said member, and upper and lower feed fingers attached to said rod, and passing from opposite sides alternately through said passage as said rod is reciprocated.

89. The combination, in a ringing machine of the class described, with a chute having a ring passage therein, ring-locating means in said passage, and a spindle adapted to take a ring from said locating means, of a pivotally-mounted spring-pressed arm provided with a finger which is adapted to be positioned across said passage and normally so retained, a trip in the path of a ring taken by said spindle, and operating means, between said trip and said arm, to cause the latter to withdraw said finger from said passage, when said trip is operated by said ring.

90. In a ringing machine of the class described, a slide carrying a ring setter, means to reciprocate said slide, and means to reciprocate said setter during the reciprocation of said slide.

91. In a ringing machine of the class described, a slide, means to reciprocate said slide, a guide slidingly mounted on said slide, and provided with a ring setter, and means to vary the movement of said guide each time said slide is reciprocated.

92. In a ringing machine of the class described, a slide, a guide reciprocably mounted on said slide, a ring setter carried by said guide, means to reciprocate said setter longitudinally when said slide is reciprocated, and means to vary the movement of said guide at each reciprocation of said slide.

93. In a ringing machine of the class described, a slide, a box mounted on said slide, a spacer rotatably mounted in said box, and having contact faces of different projections, means partially to rotate said spacer each time said slide is reciprocated, a guide slidingly mounted on said slide, said guide having a member which is in the path of said spacer, and a ring setter carried by said guide.

94. The combination, in a ringing machine of the class described, with a fixed cam bar, of a slide, and a reciprocating ring setter carried by said slide, said setter being engaged with and operated by said bar when said slide is reciprocated.

95. The combination, in a ringing machine of the class described, with a ring spindle, and means to reciprocate and to carry said spindle through an orbital path and produce dwells in such path, of a slide, a ring setter carried by said slide, and means to move said setter into operative position behind a ring on said spindle, when the latter arrives adjacent to the setter, and to remove said setter from the path of said spindle before the latter leaves its position adjacent to the setter.

96. The combination, in a ringing machine of the class described, with a slide, a box mounted on said slide, a ring spacer having contact faces of different projections, mounted to rotate in said box, and provided with a ratchet-wheel, a guide slidingly mounted on said slide, said guide having a part in the path of said spacer, and a setter carried by said guide, of a pawl pivotally mounted in the path of said ratchet-wheel, and adapted to impart a partial revolution to said spacer each time said slide is retracted.

97. In a ringing machine of the class described, a slide, a trip bar, a guide slidingly mounted on said slide, said guide having a slot at the forward end, and being provided with a ring setter, a bolt connecting said bar with said slide and passing through said slot, means to retain said bolt in place, and means to vary the movement of said guide each time said slide is reciprocated.

98. In a ringing machine of the class described, a tail-stock provided with bobbin-holding means, a ring spindle adapted to be positioned with its axis in line with the axis of said bobbin-holding means, means to transfer a ring from said spindle to a bobbin carried by said first-named means, means to advance said spindle against said bobbin and retract the spindle, and means partially to rotate said first-named means after said spindle is retracted.

99. The combination, in a ringing machine of the class described, with a tail-stock, a spindle journaled in said tail-stock, a shaft provided with a ratchet-wheel, and means to actuate said spindle from said shaft, of a slide, a trip bar attached to said slide, and a pawl pivotally connected with said bar and in engagement with said ratchet-wheel, the arrangement being such that said spindle has a partial revolution imparted thereto each time said slide and bar are retracted.

100. In a ringing machine of the class described, a tail-stock provided with a bobbin-engaging spindle, a ring spindle adapted to be located with its axis in line with the axis of said first-named spindle, and to be advanced against a bobbin carried by the former and retracted therefrom, means to transfer a ring from said spindle to said bobbin, and means partially to rotate said first-named spindle after said ring spindle has been retracted.

101. The combination, in a ringing machine of the class described, with a fixed cam plate, and a pawl pivotally mounted on a fixed support, of a slide, a box secured to said slide, a ring spacer provided with a ratchet-wheel and having varying projections, mounted to rotate in said box, said ratchet-wheel being adapted to be operated by said pawl when said slide is retracted, a slidingly-mounted guide on said slide, said guide being provided with a part that is in the path of said spacer, and a reciprocating ring setter carried by said guide, said setter being operatively connected with said bar, and adapted to be actuated in one direction when said slide is advanced, and actuated in the opposite direction when said slide is retracted.

102. The combination, in a ringing machine of the class described, with an expanding member, a tail-stock provided with a bobbin-engaging spindle, a shaft carrying a ratchet-wheel, and operating means between said shaft and said spindle, of a trip bar, an engaging member carried by said bar, operating members for said expanding member, one of which operating members extends into the path of said engaging member, and a pawl for said ratchet-wheel, said pawl being connected with said bar.

103. In a ringing machine of the class described, a main shaft, a secondary shaft, means to rotate said secondary shaft intermittently from said main shaft, a turret secured to said secondary shaft, a carriage, means to reciprocate said carriage from said main shaft, and spindles slidingly arranged in said turret and operatively connected with said carriage.

104. In a ringing machine of the class described, a main shaft, a slide, means to reciprocate said slide from said main shaft, and a ring setter carried by said slide.

105. In a ringing machine of the class described, a main shaft, a slide, means to reciprocate said slide from said main shaft, a ring setter carried by said slide, and means to cause said setter to be reciprocated by the reciprocating action of said slide.

106. In a ringing machine of the class described, a main shaft, a slide, means to reciprocate said slide from said main shaft, a ring setter carried by said slide, and means also carried by said slide to vary the movement of said setter transversely.

107. In a ringing machine of the class described, a main shaft, a slide, means to reciprocate said slide from said main shaft, a ring setter carried by said slide, means also carried by said slide to vary the movement of said setter transversely, and means to cause said setter to be reciprocated longitudinally during the reciprocation of said slide.

108. In a ringing machine of the class described, a main shaft, a secondary shaft, means intermittently to rotate said secondary shaft, a turret secured to said secondary shaft, a carriage, means to reciprocate said carriage from said main shaft, expanding and contracting spindles slidingly mounted in said turret, and in operative connection with said carriage, an expander plunger for said spindles, and means operated from said main shaft to cause said plunger to make its active stroke.

109. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and in operative connection with said carriage, a tail-stock, a bobbin-engaging spindle journaled in said tail-stock, and means operated from said main shaft to impart intermittently a rotary motion to said last-named spindle.

110. In a ringing machine of the class described, a main shaft, a secondary shaft, means intermittently to rotate said secondary shaft, a turret secured to said secondary shaft, a carriage, means to reciprocate said carriage from said main shaft, a rod connected and reciprocated with said carriage, and ring-feeding fingers carried by said rod.

111. In a ringing machine of the class described, a main shaft, a secondary shaft, means intermittently to rotate said secondary shaft from said main shaft, a turret secured to said secondary shaft, a carriage, means to reciprocate said carriage from said main shaft, a spindle slidingly arranged in said turret, and operatively connected with said carriage, a rod connected and reciprocating with said carriage, ring-feeding fingers carried by said rod, and an expander plunger, a ring setter, and means to cause said plunger to make its active stroke, all operated from said main shaft.

112. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly mounted in said turret, and operatively connected with said carriage, an expander plunger, a ring setter, a tail-stock provided with a bobbin-engaging spindle, and means to cause said plunger to make its active stroke, operate said setter, and intermittently rotate said last-named spindle, from said main shaft.

113. In a ringing machine of the class described, a main shaft, a secondary shaft, means intermittently to rotate said secondary shaft from said main shaft, a turret secured to said secondary shaft, a carriage, means to reciprocate said carriage from said main shaft, a rod connected and operated with said carriage, ring spindles slidingly mounted in said turret, and operatively connected with said carriage, ring-feeding fingers carried by said rod, an expander plunger, a ring setter, a tail-stock provided with a bobbin-engaging spindle, and means to cause said plunger to make its active stroke, said setter to be operated, and said last-named spindle to be intermittently rotated, from said main shaft.

114. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and operatively connected with said carriage, an expander plunger, a ring setter, a tail-stock provided with a bobbin-engaging spindle, and means operated from said main shaft to cause said plunger to make its active stroke, said setter to be moved laterally, said setter to be reciprocated laterally, and said last-named spindle to be rotated intermittently.

115. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and operatively connected with said carriage, an expander plunger, a ring setter, a tail-stock provided with a bobbin-engaging spindle, and means operated from said main shaft to cause said plunger to make its active stroke, said setter to be moved laterally and to have its lateral movement varied, said setter to be reciprocated longitudinally, and said last-named spindle to be rotated intermittently.

116. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and operatively connected with said carriage, a chute having a ring passage therein, a sorter for rings in said passage, means to rotate said sorter from said main shaft, and means to present rings delivered by said sorter to said spindles, when each of the latter arrives in operative position relative to said last-named means.

117. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and operatively connected with said carriage, a chute having a ring passage therein, a ring hopper, a feed roll to assist in conveying rings from said hopper to said passage, means to rotate said roll from said main shaft, and means to present rings delivered by said roll through said passage to said spindles, when each of the latter arrives in operative position relative to said last-named means.

118. In a ringing machine of the class described, a main shaft, a secondary shaft, means intermittently to rotate said secondary shaft from said main shaft, a turret secured to said secondary shaft, a carriage, means to reciprocate said carriage from said main shaft, ring spindles slidingly arranged in said turret, and operatively connected with said carriage, a chute having a ring passage therein, a ring hopper, a feed roll to assist in conveying rings from said hopper to said passage, a sorter for rings in said passage, means to rotate said roll and sorter from said main shaft, and means to present rings delivered by said roll and sorter through said passage to said spindles, when each of the latter arrives in operative position relative to said last-named means.

119. In a ringing machine of the class described, automatic receiving, expanding, and carrying means for rings, and means progressively to set said rings on bobbins.

120. In a ringing machine of the class described, automatic receiving, expanding, carrying, and rotating means for rings, and means progressively to set said rings on bobbins.

121. In a ringing machine of the class described, automatically reciprocating and intermittently rotating means to receive and carry rings, and means to set said rings on bobbins.

122. In a ringing machine of the class described, automatically reciprocating and intermittently rotating means to receive, expand, and carry rings, and means to set said rings on bobbins.

123. In a ringing machine of the class described, automatically reciprocating and intermittently rotating means to receive, expand, carry, and rotate rings, and means to set said rings on bobbins.

124. In a ringing machine of the class described, means to support a bobbin in a horizontal position, automatic means progressively to set rings on a bobbin carried by said supporting means, and automatic means to locate such rings on such bobbin with the ring joints in offset relationship.

WINTHROP T. JACKMAN.

Witnesses:
 EDWARD GUSFER,
 K. C. BUTLER.